(12) United States Patent
Higaki et al.

(10) Patent No.: US 10,742,128 B2
(45) Date of Patent: Aug. 11, 2020

(54) PARALLEL POWER SUPPLY DEVICE

(71) Applicant: Mitsubishi Electric Corporation, Chiyoda-ku (JP)

(72) Inventors: Yusuke Higaki, Chiyoda-ku (JP); Ryota Kondo, Chiyoda-ku (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 46 days.

(21) Appl. No.: 16/094,977

(22) PCT Filed: Mar. 15, 2017

(86) PCT No.: PCT/JP2017/010412
§ 371 (c)(1),
(2) Date: Oct. 19, 2018

(87) PCT Pub. No.: WO2018/003199
PCT Pub. Date: Jan. 4, 2018

(65) Prior Publication Data
US 2019/0157979 A1 May 23, 2019

(30) Foreign Application Priority Data
Jun. 30, 2016 (JP) ................................ 2016-130016

(51) Int. Cl.
*H02M 3/335* (2006.01)
*H02M 3/28* (2006.01)
(Continued)

(52) U.S. Cl.
CPC ......... *H02M 3/33584* (2013.01); *H02M 3/28* (2013.01); *H02J 1/10* (2013.01);
(Continued)

(58) Field of Classification Search
CPC ... H02M 2001/0025; H02M 2001/008; H02M 3/33584; H02M 1/083; H02M 3/28;
(Continued)

(56) References Cited

U.S. PATENT DOCUMENTS 6,243,277 B1* 6/2001 Sun .......................... H02J 7/34
323/222
2002/0109469 A1* 8/2002 Ito .......................... H05B 41/234
315/291
(Continued)

FOREIGN PATENT DOCUMENTS

| JP | 2001-209437 A | 8/2001 |
|----|---------------|--------|
| WO | WO 2013/121665 A1 | 8/2013 |
| WO | WO 2015/004825 A1 | 1/2015 |

OTHER PUBLICATIONS

International Search Report dated May 9, 2017 in the International Application No. PCT/JP2017/010412 filed on Mar. 15, 2017.

*Primary Examiner* — Rexford N Barnie
*Assistant Examiner* — Kalu Kelly Emeaba
(74) *Attorney, Agent, or Firm* — Xsensus LLP

(57) ABSTRACT

A parallel power supply device includes a plurality of DC/DC converters connected in parallel, and each DC/DC converter includes: first and second switching circuits with a transformer therebetween; first and second reactors; and a control circuit. The control circuit generates a duty cycle so that a deviation between voltage of a load and target voltage becomes 0. Correction is performed such that, when the magnitude of the duty cycle is smaller than a set value Vth, the magnitude is fixed at 0, and otherwise, the magnitude is decreased by the set value Vth. Then, the phase shift amounts for drive signals for the first and second switching circuits are determined, and the first and second switching circuits are subjected to phase shift control.

20 Claims, 18 Drawing Sheets

(51) Int. Cl.
   *H02J 1/10* (2006.01)
   *H02M 1/00* (2006.01)
   *H02J 7/34* (2006.01)

(52) U.S. Cl.
   CPC ............... *H02J 1/102* (2013.01); *H02J 1/106* (2020.01); *H02J 7/34* (2013.01); *H02M 2001/008* (2013.01); *H02M 2001/0025* (2013.01)

(58) Field of Classification Search
   CPC .... H02M 2001/0048; H02J 1/10; H02J 1/102; H02J 1/106; H02J 1/00; H02J 7/00; H02J 7/34
   See application file for complete search history.

(56) References Cited

U.S. PATENT DOCUMENTS

| | | | |
|---|---|---|---|
| 2002/0117972 A1* | 8/2002 | Ito | H05B 41/042 315/219 |
| 2015/0015181 A1 | 1/2015 | Kondo et al. | |
| 2015/0214847 A1* | 7/2015 | Shimada | H02M 3/33584 320/107 |
| 2016/0087545 A1 | 3/2016 | Higaki et al. | |
| 2016/0118902 A1* | 4/2016 | Huang | H02J 7/345 363/21.04 |
| 2017/0085106 A1* | 3/2017 | Bai | H02J 7/00 |
| 2017/0117731 A1* | 4/2017 | Shimada | H02M 3/335 |
| 2017/0310212 A1* | 10/2017 | Higaki | H02M 3/18 |
| 2018/0062430 A1* | 3/2018 | Matsumoto | B60L 53/122 |
| 2018/0083527 A1* | 3/2018 | Fukuda | B60L 50/50 |

* cited by examiner

PARALLEL POWER SUPPLY DEVICE

TECHNICAL FIELD

The present invention relates to a parallel power supply device which has a plurality of power supply devices connected in parallel and operates a common load.

BACKGROUND ART

A conventional parallel power supply device has a plurality of power supply devices connected in parallel and operates a common load. Each power supply device generates a current detection signal by detecting output current of the power supply device, compares the current detection signal of the power supply device with a current detection signal generated by another power supply device to obtain a first comparison result, compares the current detection signal of the power supply device with the first comparison result to obtain a second comparison result, and adjusts output voltage of the power supply device on the basis of the second comparison result (see, for example, Patent Document 1).

A conventional DC/DC converter used in each of the power supply devices connected in parallel in the parallel power supply device is, for example, configured as follows. In this DC/DC converter, a first switching circuit is connected between a first winding of a transformer and a DC power supply, and a second switching circuit is connected between a second winding and a battery. In the case of charging the battery, a control circuit turns off elements of a second bridge circuit in the second switching circuit, and controls, relative to a drive phase for a first reference element of a first bridge circuit in the first switching circuit, a phase shift amount for a first diagonal element thereof and a phase shift amount for a second diagonal element in a second bridge circuit. In the case of discharging the battery, the control circuit turns off elements of the first bridge circuit, and controls, relative to a drive phase for a second reference element of the second bridge circuit, a phase shift amount for the second diagonal element and a phase shift amount for the first diagonal element (see, for example, Patent Document 2).

CITATION LIST

Patent Document

Patent Document 1: Japanese Laid-Open Patent Publication No. 2001-209437
Patent Document 2: International Publication No. WO2015/004825

SUMMARY OF THE INVENTION

Problems to be Solved by the Invention

In the parallel power supply device described in Patent Document 1, output voltage values of the plurality of power supply devices are controlled to be balanced and coincide with each other. However, in control of each power supply device, it is necessary to obtain not only a current detection signal of the power supply device but also a current detection signal generated by another power supply device. Therefore, it is impossible to control each power supply device independently, and since the plurality of power supply devices need to be connected to each other, it is impossible to freely provide or add the power supply devices.

In the case where a plurality of bidirectional-type DC/DC converters described in Patent Document 2 are operated in parallel, output currents of the plurality of DC/DC converters differ from each other due to detection error of voltage/current relevant to control of the DC/DC converters. The difference current circulates among the plurality of DC/DC converters and thus serves as reactive current. In particular, if the polarities of output currents of the plurality of DC/DC converters become different from each other, there is a problem that loss occurring in the DC/DC converters increases.

The present invention has been made to solve the above problems, and an object of the present invention is to provide a parallel power supply device in which a plurality of bidirectional-type DC/DC converters are connected in parallel and which controls each of the DC/DC converters which are power supply devices, independently, and prevents the polarities of output currents of the plurality of DC/DC converters from becoming different from each other, thereby balancing the output currents and achieving loss reduction.

Solution to the Problems

A parallel power supply device according to the present invention has a plurality of DC/DC converters each of which performs bidirectional power transmission and which are connected in parallel, to supply power to a common load. Each DC/DC converter includes: a transformer; a first switching circuit configured to be a full-bridge circuit with two bridge circuits having a plurality of semiconductor switching elements to which diodes are respectively connected in antiparallel, the first switching circuit being connected between the common load and a first winding of the transformer and performing power conversion between DC and AC; a second switching circuit configured to be a full-bridge circuit with two bridge circuits having a plurality of semiconductor switching elements to which diodes are respectively connected in antiparallel, the second switching circuit being connected between a DC power supply and a second winding of the transformer and performing power conversion between DC and AC; a first reactor and a second reactor connected to AC input/output lines of the first switching circuit and the second switching circuit, respectively; and a control circuit for controlling the first switching circuit and the second switching circuit. Each control circuit includes a voltage control unit having a compensator and generating a duty cycle so that a deviation between voltage of the common load and target voltage becomes 0, and on the basis of the duty cycle, the control circuit determines first and second phase shift amounts for drive signals for the first and second switching circuits, to control the first and second switching circuits. Each control circuit uses the duty cycle corrected such that, when a magnitude of the duty cycle generated by the voltage control unit is smaller than a set value, the magnitude is fixed at 0, and otherwise, the magnitude is decreased by the set value.

Effect of the Invention

With the parallel power supply device according to the present invention, the control circuits can respectively control the plurality of DC/DC converters independently, and the polarities of output currents of the plurality of DC/DC converters are prevented from becoming different from each other, whereby the output currents can be balanced. Therefore, it is possible to obtain a parallel power supply device that is high in the degree of freedom in provision or addition of the DC/DC converters and is low in loss.

DESCRIPTION OF EMBODIMENTS

Embodiment 1

Hereinafter, embodiment 1 of the present invention will be described.

Figure 1:
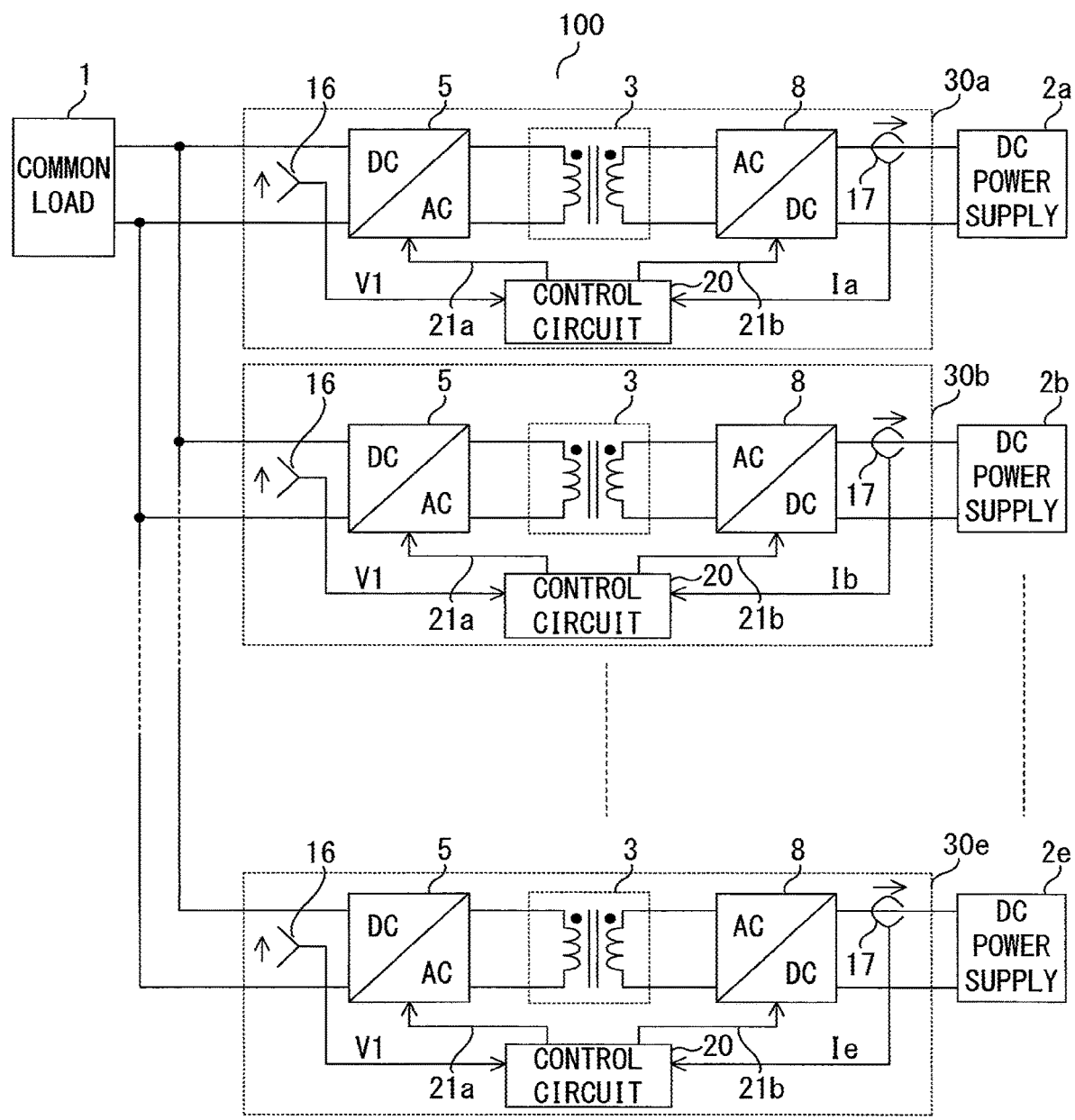
FIG. 1 is a schematic configuration diagram of a parallel power supply device according to embodiment 1 of the present invention.

FIG. 1 is a diagram showing the schematic configuration of a parallel power supply device according to embodiment 1 of the present invention. As shown in FIG. 1, a parallel power supply device 100 includes a plurality of DC/DC converters 30a to 30e connected in parallel, between a common load 1 as a load or a power source and a plurality of DC power supplies 2a to 2e as power sources or loads. The plurality of DC/DC converters 30a to 30e have, on the common load 1 side, terminals connected in parallel with each other and connected to the common load 1, and the DC/DC converters 30a to 30e are respectively connected to the DC power supplies 2a to 2e. It is noted that the number of DC/DC converters 30a to 30e only has to be plural.

Each DC/DC converter 30a to 30e includes: a transformer 3; a first switching circuit 5 which is connected between the transformer 3 and the common load 1 and performs power conversion between DC and AC; a second switching circuit 8 which is connected between the transformer 3 and the corresponding DC power supply 2a to 2e and performs power conversion between DC and AC; and a control circuit 20, and performs power transmission in both directions. Each DC/DC converter 30a to 30e is provided with a voltage detector 16 for detecting voltage V1 between both ends of the common load 1 connected to the first switching circuit 5, and a current detector 17 for detecting current Ia to Ie between the second switching circuit 8 and the corresponding DC power supply 2a to 2e. On the basis of the detected voltage V1 and current Ia to Ie, each control circuit 20 generates drive signals 21a, 21b to control the first and second switching circuits 5, 8.

In this case, the direction of currents Ia to Ie from the second switching circuit 8 toward the DC power supplies 2a to 2e is defined as positive. Operation of power transmission from the common load 1 to the DC power supplies 2a to 2e, in which currents Ia to Ie are positive, is referred to as charging operation. Operation of power transmission from the DC power supplies 2a to 2e to the common load 1, in which currents Ia to Ie are negative, is referred to as discharging operation.

Figure 2:
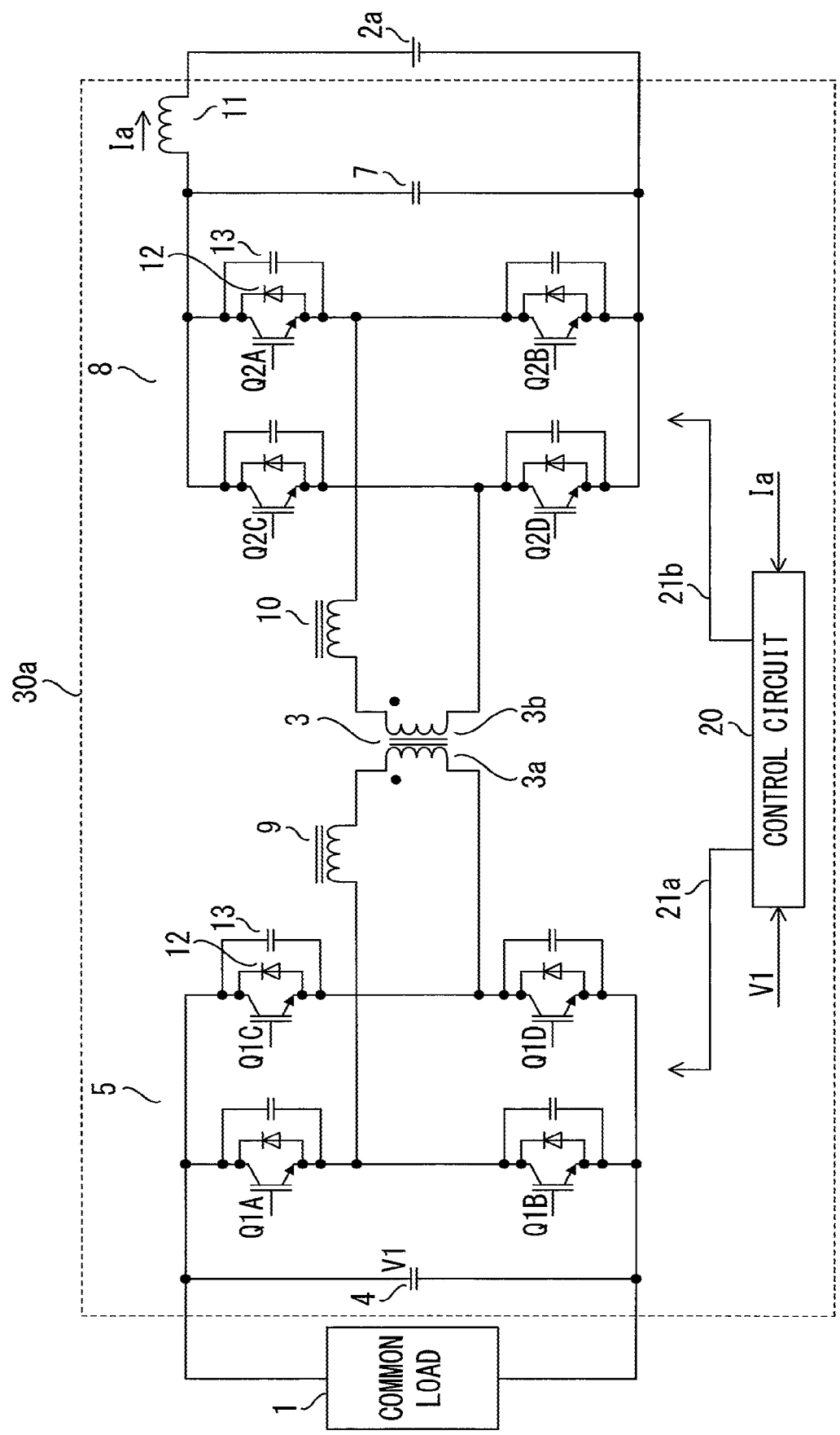
FIG. 2 is a circuit diagram showing the configuration of a DC/DC converter according to embodiment 1 of the present invention.

FIG. 2 is a circuit diagram showing the detailed configuration of the DC/DC converter 30a. It is noted that the configurations and operations of the other DC/DC converters 30b to 30e are also the same as those of the DC/DC converter 30a, and therefore, in the following description, description of the DC/DC converters 30b to 30e is omitted.

The DC/DC converter 30a includes: the isolated transformer 3; a first smoothing capacitor 4 connected in parallel to the common load 1; the first switching circuit 5; a second smoothing capacitor 7 connected in parallel to the DC power supply 2a; the second switching circuit 8; and a first reactor 9 and a second reactor 10 connected to AC input/output lines of the first switching circuit 5 and the second switching circuit 8, respectively. The DC/DC converter 30a further includes the control circuit 20 for controlling the first switching circuit 5 and the second switching circuit 8.

The first switching circuit 5 is a full-bridge circuit having a plurality of semiconductor switching elements Q1A, Q1B, Q1C, Q1D (hereinafter, simply referred to as Q1A, Q1B, Q1C, Q1D or semiconductor switching elements Q) formed from IGBTs, MOSFETs, or the like to which diodes 12 are connected in antiparallel. The first switching circuit 5 has a DC side connected to the first smoothing capacitor 4 and an AC side connected to a first winding 3a of the transformer 3, and performs bidirectional power conversion between DC and AC. Also, the first switching circuit 5 is a zero voltage switching circuit in which voltage between both ends of each semiconductor switching element Q at the time of switching can be made almost zero, and capacitors 13 are connected in parallel to the respective semiconductor switching elements Q. The first reactor 9 is connected to the AC input/output line between the semiconductor switching elements Q and the transformer 3, and the first reactor 9 and the first winding 3a are connected in series.

The second switching circuit 8 is a full-bridge circuit having a plurality of semiconductor switching elements Q2A, Q2B, Q2C, Q2D (hereinafter, simply referred to as Q2A, Q2B, Q2C, Q2D or semiconductor switching elements Q) formed from IGBTs, MOSFETs, or the like to which diodes 12 are connected in antiparallel. The second switching circuit 8 has a DC side connected to the second smoothing capacitor 7 and an AC side connected to a second winding 3b of the transformer 3, and performs bidirectional power conversion between DC and AC. Also, the second switching circuit 8 is a zero voltage switching circuit in which voltage between both ends of the semiconductor switching element Q at the time of switching can be made almost zero, and capacitors 13 are connected in parallel to the respective semiconductor switching elements Q. The second reactor 10 is connected to the AC input/output line between the transformer 3 and the semiconductor switching elements Q, and the second reactor 10 and the second winding 3b are connected in series. A reactor 11 is connected to the DC side of the second switching circuit 8.

The current detector 17 (see FIG. 1) for detecting current Ia flowing through the reactor 11 is provided between the second smoothing capacitor 7 and the DC power supply 2a, and the sensed output is inputted to the control circuit 20. The voltage detector 16 (see FIG. 1) for detecting voltage V1 of the first smoothing capacitor 4 is provided, and the sensed output is inputted to the control circuit 20. On the basis of the inputted values of current Ia and voltage V1, the control circuit 20 generates drive signals 21a, 21b for performing switching control of the semiconductor switching elements Q of the first switching circuit 5 and the second switching circuit 8, thereby performing drive control of the first switching circuit 5 and the second switching circuit 8.

The current detector 17 may be provided at a position on the second switching circuit 8 side with respect to the second smoothing capacitor 7.

Next, operation of the DC/DC converter 30a will be described below.

The control circuit 20 in the DC/DC converter 30a performs phase shift control of the first and second switching circuits 5, 8 by the drive signals 21a, 21b, thereby adjusting current Ia. In the phase shift control, on the basis of a duty cycle, first and second phase shift amounts θ1, θ2 for the drive signals 21a, 21b for the first and second switching circuits 5, 8 are determined, whereby the first and second switching circuits 5, 8 are controlled. Hereinafter, this control will be described in detail.

Figure 3:
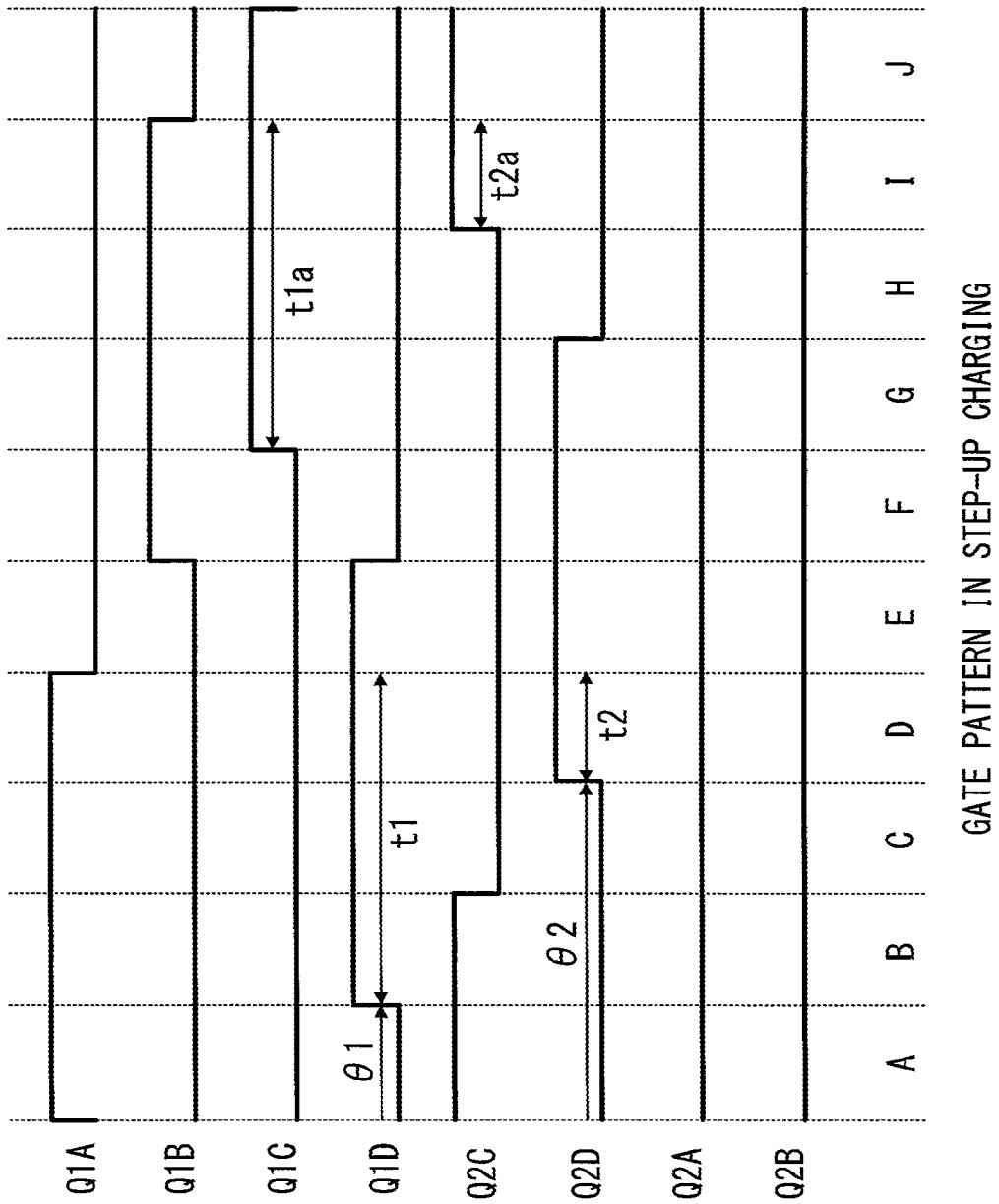
FIG. 3 is a drive signal waveform diagram in the case of step-up charging of the DC/DC converter according to embodiment 1 of the present invention.

FIG. 3 shows waveforms of the drive signals 21a, 21b for the semiconductor switching elements Q of the first switching circuit 5 and the second switching circuit 8 in step-up charging operation of the DC/DC converter 30a. In this case, current Ia is positive and operation of power transmission from the common load 1 to the DC power supply 2a is performed.

In the drawings, periods A to J are respectively assigned for a plurality of gate patterns which are combination patterns of the drive signals. In FIG. 3, for convenience sake, the drive signals for Q1A, Q1B, Q1C, Q1D, Q2C, Q2D, Q2A, Q2B are denoted by the reference characters of the respective elements.

All the drive signals are generated using, as a reference, a first bridge circuit (Q1A, Q1B) which is one of the bridge circuits in the first switching circuit 5 as a power-transmitting-side circuit. Q2A and Q2B of the second bridge circuit (Q2A, Q2B) which is one of the bridge circuits in the second switching circuit 8 as a power-receiving-side circuit are kept in an OFF state.

In three bridge circuits other than the second bridge circuit (Q2A, Q2B), Q1A, Q1C, Q2C on the positive side (high-voltage side) and Q1B, Q1D, Q2D on the negative side (low-voltage side) which compose the respective bridge circuits are controlled with an ON time ratio of 50%, except for short-circuit prevention time. The short-circuit prevention time is a time set for preventing a semiconductor switching element on the positive side and a semiconductor switching element on the negative side from being turned on at the same time, so that, when the set short-circuit prevention time elapses after one of the semiconductor switching elements is turned off, the other one is turned on. In order that each semiconductor switching element Q of the first switching circuit 5 on the power-transmitting side performs zero voltage switching, control is performed so that, within the short-circuit prevention time, voltage of the capacitor 13 connected in parallel to the semiconductor switching element Q increases to voltage of the first smoothing capacitor 4 or decreases to be close to zero voltage.

Q1A in the first bridge circuit (Q1A, Q1B) is defined as a first reference element, and Q2A in the second bridge circuit (Q2A, Q2B) is defined as a second reference element. Q1D diagonal to the first reference element Q1A is defined as a first diagonal element, and Q2D diagonal to the second reference element Q2A is defined as a second diagonal element.

A phase shift amount θ1 (first phase shift amount) for the drive signal for the first diagonal element Q1D relative to the phase of the drive signal for the first reference element Q1A (reference element of power-transmitting-side circuit), and a phase shift amount θ2 (second phase shift amount) for the drive signal for the second diagonal element Q2D relative to the phase of the drive signal for the first reference element Q1A, are determined in accordance with a duty cycle which is a control command. That is, the phase shift amounts θ1, θ2 are controlled in accordance with the duty cycle. While the details of the control of the phase shift amounts θ1, θ2 will be described later, in this case, the phase shift amount θ1 is kept minimum and the phase shift amount θ2 is changed in accordance with the duty cycle.

As shown in the drawings, a period during which the first reference element Q1A and the first diagonal element Q1D are both ON is defined as a diagonal ON time t1, and the diagonal ON time t1 is determined by the phase shift amount θ1. It is noted that a diagonal ON time t1a during which Q1B and Q1C are both ON is also equal to the diagonal ON time t1.

For the second bridge circuit (Q2A, Q2B), drive signals equal to those for the first bridge circuit (Q1A, Q1B) are assumed as virtual drive signals, and a period during which a virtual ON time of Q2A due to the virtual drive signal for the second reference element Q2A and an ON time of the second diagonal element Q2D overlap each other is defined as a virtual diagonal ON time t2. The virtual diagonal ON time t2 is determined by the phase shift amount θ2 for the drive signal for the second diagonal element Q2D relative to the phase of the drive signal for the first reference element Q1A. It is noted that a virtual diagonal ON time t2a during which a virtual ON time of Q2B due to the virtual drive signal for Q2B and an ON time of Q2C overlap each other is also equal to the virtual diagonal ON time t2.

Hereinafter, operation of the DC/DC converter 30a in one cycle will be briefly described with reference to FIG. 3. It is noted that voltage of the DC power supply 2a is assumed to be higher than voltage occurring on the second winding 3b, and power is transmitted from the common load 1 to the DC power supply 2a.

For convenience sake, description will be started from the period B.

During the period B, in the first switching circuit 5, the polarity of current is inverted from the polarity in the period A and energy is transmitted from the common load 1 side, and in the second switching circuit 8, backflow current flows. Therefore, the first reactor 9 and the second reactor 10 are excited.

During the period C, in the first switching circuit 5, energy is transmitted from the common load 1 side, and in the second switching circuit 8, power is transmitted to the DC power supply 2a side. Therefore, excitation energy of the first reactor 9 and the second reactor 10 is transmitted to the DC power supply 2a side.

During the period D, in the first switching circuit 5, energy is transmitted from the common load 1 side, and in the second switching circuit 8, Q2D is turned on, but power is still transmitted to the DC power supply 2a side. Therefore, excitation energy of the first reactor 9 and the second reactor 10 is transmitted to the DC power supply 2a side.

During the period E, in the first switching circuit 5, Q1A is turned off and current flows back, and in the second switching circuit 8, backflow current gradually decreases due to voltage of the DC power supply 2a, and when the backflow current reaches 0, this state is kept.

During the period F, in the first switching circuit 5, Q1B is turned on by ZVS (zero voltage switching), and if some backflow current is left, the backflow current is regenerated to the common load 1 side. In the second switching circuit 8, backflow current gradually decreases, and when the backflow current reaches 0, this state is kept.

During the period G, in the first switching circuit 5, the polarity of current is inverted from the polarity in the period F and energy is transmitted from the common load 1 side, and in the second switching circuit 8, backflow current flows. Therefore, the first reactor 9 and the second reactor 10 are excited.

During the period H, in the first switching circuit 5, energy is transmitted from the common load 1 side, and in the second switching circuit 8, power is transmitted to the DC power supply 2a side. Therefore, excitation energy of the first reactor 9 and the second reactor 10 is transmitted to the DC power supply 2a side.

During the period I, in the first switching circuit 5, energy is transmitted from the common load 1 side, and in the second switching circuit 8, Q2C is turned on, but power is still transmitted to the DC power supply 2a side. Therefore, excitation energy of the first reactor 9 and the second reactor 10 is transmitted to the DC power supply 2a side.

During the period J, in the first switching circuit 5, Q1B is turned off and current flows back, and in the second switching circuit 8, backflow current gradually decreases due to voltage of the DC power supply 2a, and when the backflow current reaches 0, this state is kept.

During the period A, in the first switching circuit 5, Q1A is turned on by ZVS (zero voltage switching), and if the backflow current in the period J is left, the backflow current is regenerated to the common load 1 side. In the second switching circuit 8, backflow current gradually decreases, and when the backflow current reaches 0, this state is kept.

Through repetition of a series of controls (periods A to J) as described above, the DC/DC converter 30a steps up voltage generated on the second winding 3b of the transformer 3 and supplies power to the DC power supply 2a.

The first switching circuit 5 outputs a positive pulse of voltage V1 of the common load 1 during the diagonal ON time t1 in which Q1A and Q1D are both ON, and outputs a negative pulse of voltage (−V1) thereof during the diagonal ON time t1a in which Q1B and Q1C are both ON, to apply these voltages to the transformer 3. Then, the second switching circuit 8 performs step-up operation by having a period in which the second reactor 10 is excited, i.e., using the second reactor 10 as a step-up reactor, in the diagonal ON times (t1, t1a) in which voltage is applied to the transformer 3.

All of the switching operations of the semiconductor switching elements Q in the first switching circuit 5 on the primary side of the transformer 3 are zero voltage switching owing to the capacitor 13 and the first reactor 9. It is noted that some of the switching operations in the second switching circuit 8 on the secondary side are zero voltage switching.

Q2A and Q2B in the second bridge circuit (Q2A, Q2B) are kept in an OFF state. Therefore, during the periods E, F, when the backflow current decreases to be zero, the diode of Q2A is turned off, so that reverse current does not flow. Also during the periods J, A, when the backflow current decreases to be zero, the diode of Q2B is turned off, so that reverse current does not flow.

Figure 4:
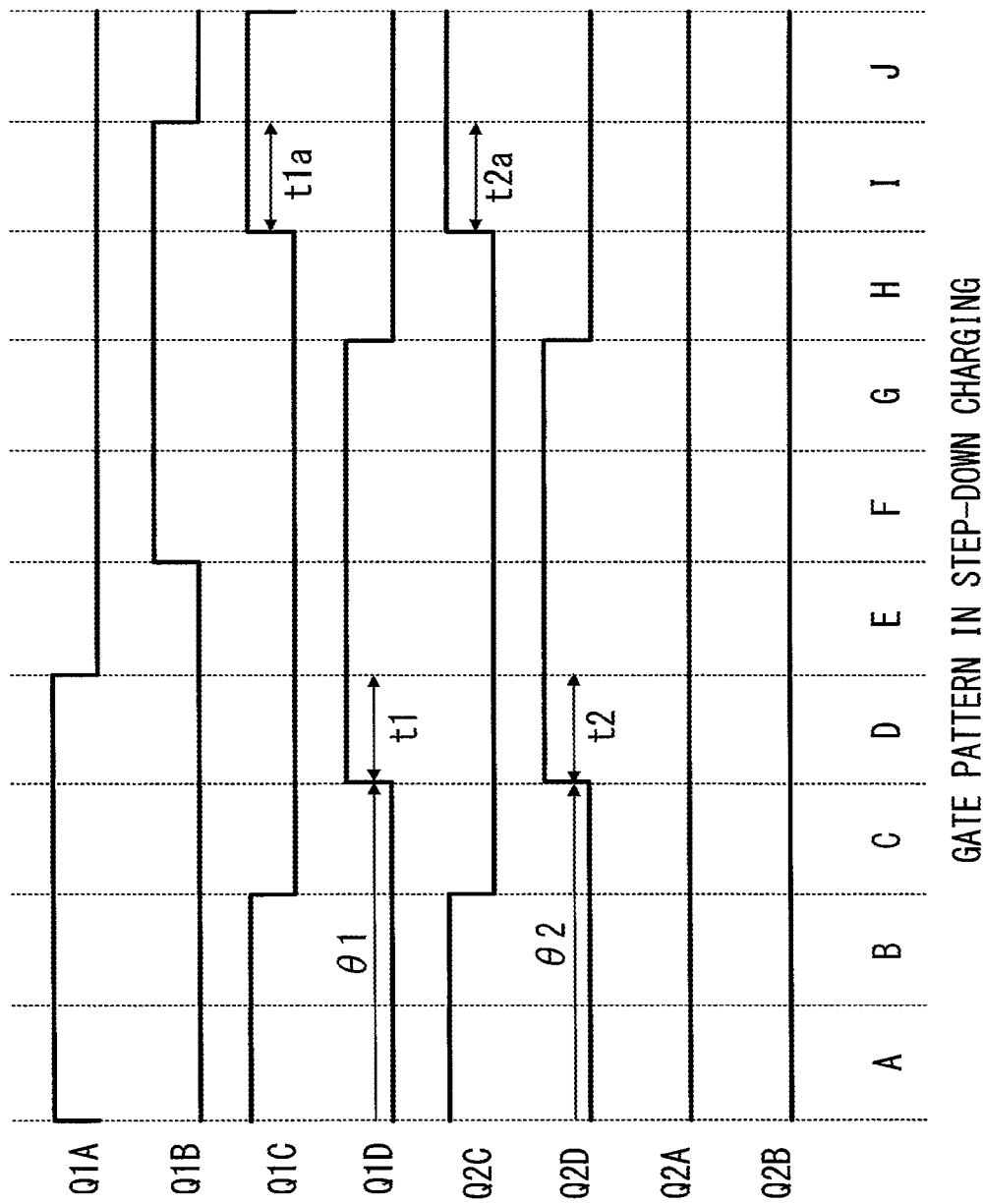
FIG. 4 is a drive signal waveform diagram in the case of step-down charging of the DC/DC converter according to embodiment 1 of the present invention.

Next, FIG. 4 shows waveforms of the drive signals 21a, 21b for the semiconductor switching elements Q of the first switching circuit 5 and the second switching circuit 8 in step-down charging operation of the DC/DC converter 30a. Also in this case, in the drawings, periods A to J are respectively assigned for a plurality of gate patterns which are combination patterns of the drive signals, and for convenience sake, the drive signals for Q1A, Q1B, Q1C, Q1D, Q2C, Q2D, Q2A, Q2B are denoted by the reference characters of the respective elements.

As in the case of step-up charging shown in FIG. 3, all the drive signals are generated using, as a reference, a first bridge circuit (Q1A, Q1B) in the first switching circuit 5 which is a power-transmitting-side circuit, and Q2A and Q2B of the second bridge circuit (Q2A, Q2B) in the second switching circuit 8 are kept in an OFF state. In three bridge circuits other than the second bridge circuit (Q2A, Q2B), Q1A, Q1C, Q2C on the positive side (high-voltage side) and Q1B, Q1D, Q2D on the negative side (low-voltage side) which compose the respective bridge circuits are controlled with an ON time ratio of 50%, except for short-circuit prevention time.

A phase shift amount θ1 (first phase shift amount) for the drive signal for the first diagonal element Q1D relative to the phase of the drive signal for the first reference element Q1A (reference element of power-transmitting-side circuit), and a phase shift amount θ2 (second phase shift amount) for the drive signal for the second diagonal element Q2D relative to the phase of the drive signal for the first reference element Q1A, are determined in accordance with a duty cycle which is a control command. In this case, the phase shift amount θ1 and the phase shift amount θ2 are equal to each other, and both phase shift amounts θ1, θ2 are changed in accordance with the duty cycle.

Also in this case, the diagonal ON times t1, t1a are determined by the phase shift amount θ1. For the second bridge circuit (Q2A, Q2B), drive signals equal to those for the first bridge circuit (Q1A, Q1B) are assumed as virtual drive signals, and then the virtual diagonal ON times t2, t2a as described above are determined by the phase shift amount θ2. In this case, the diagonal ON times t1, t1a and the virtual diagonal ON times t2, t2a are equal to each other.

Hereinafter, operation of the DC/DC converter 30a in one cycle will be briefly described with reference to FIG. 4. It is noted that voltage of the DC power supply 2a is assumed to be lower than voltage occurring on the second winding 3b, and power is transmitted from the common load 1 to the DC power supply 2a.

For convenience sake, description will be started from the period D.

During the period D, in the first switching circuit 5, energy is transmitted from the common load 1 side, and in the second switching circuit 8, power is transmitted to the DC power supply 2a side.

During the period E, in the first switching circuit 5, Q1A is turned off and current flows back, and in the second switching circuit 8, backflow current gradually decreases due to voltage of the DC power supply 2a, and when the backflow current reaches 0, this state is kept.

During the periods F, G, in the first switching circuit 5, Q1B is turned on by ZVS (zero voltage switching) and current flows back. In the second switching circuit 8, backflow current gradually decreases, and when the backflow current reaches 0, this state is kept.

During the period H, in the first switching circuit 5, if some backflow current is left, the backflow current is regenerated to the common load 1 side. In the second switching circuit 8, backflow current gradually decreases, and when the backflow current reaches 0, this state is kept.

During the period I, in the first switching circuit 5, the polarity of current is inverted from the polarity in the period H and energy is transmitted from the common load 1 side. In the second switching circuit 8, power is transmitted to the DC power supply 2a side.

During the period J, in the first switching circuit 5, Q1B is turned off and current flows back, and in the second switching circuit 8, backflow current gradually decreases due to voltage of the DC power supply 2a, and when the backflow current reaches 0, this state is kept.

Next, during the periods A, B, in the first switching circuit 5, Q1A is turned on by ZVS (zero voltage switching) and current flows back. In the second switching circuit 8, backflow current gradually decreases, and when the backflow current reaches 0, this state is kept.

During the period C, in the first switching circuit 5, if some backflow current is left, the backflow current is regenerated to the common load 1 side. In the second switching circuit 8, backflow current gradually decreases, and when the backflow current reaches 0, this state is kept.

Through repetition of a series of controls (periods A to J) as described above, the DC/DC converter 30a steps down voltage generated on the second winding 3b of the transformer 3 and supplies power to the DC power supply 2a.

All of the switching operations of the semiconductor switching elements Q in the first switching circuit 5 on the primary side of the transformer 3 are zero voltage switching owing to the capacitor 13 and the first reactor 9. It is noted that some of the switching operations in the second switching circuit 8 on the secondary side are zero voltage switching.

Q2A and Q2B in the second bridge circuit (Q2A, Q2B) are kept in an OFF state. Therefore, during the periods E to H, when the backflow current decreases to be zero, the diode of Q2A is turned off, so that reverse current does not flow. Also during the periods J and A to C, when the backflow current decreases to be zero, the diode of Q2B is turned off, so that reverse current does not flow.

Next, the case where the DC/DC converter 30a transmits power from the DC power supply 2a to the common load 1 will be described. In this case, current Ia is negative.

Figure 5:
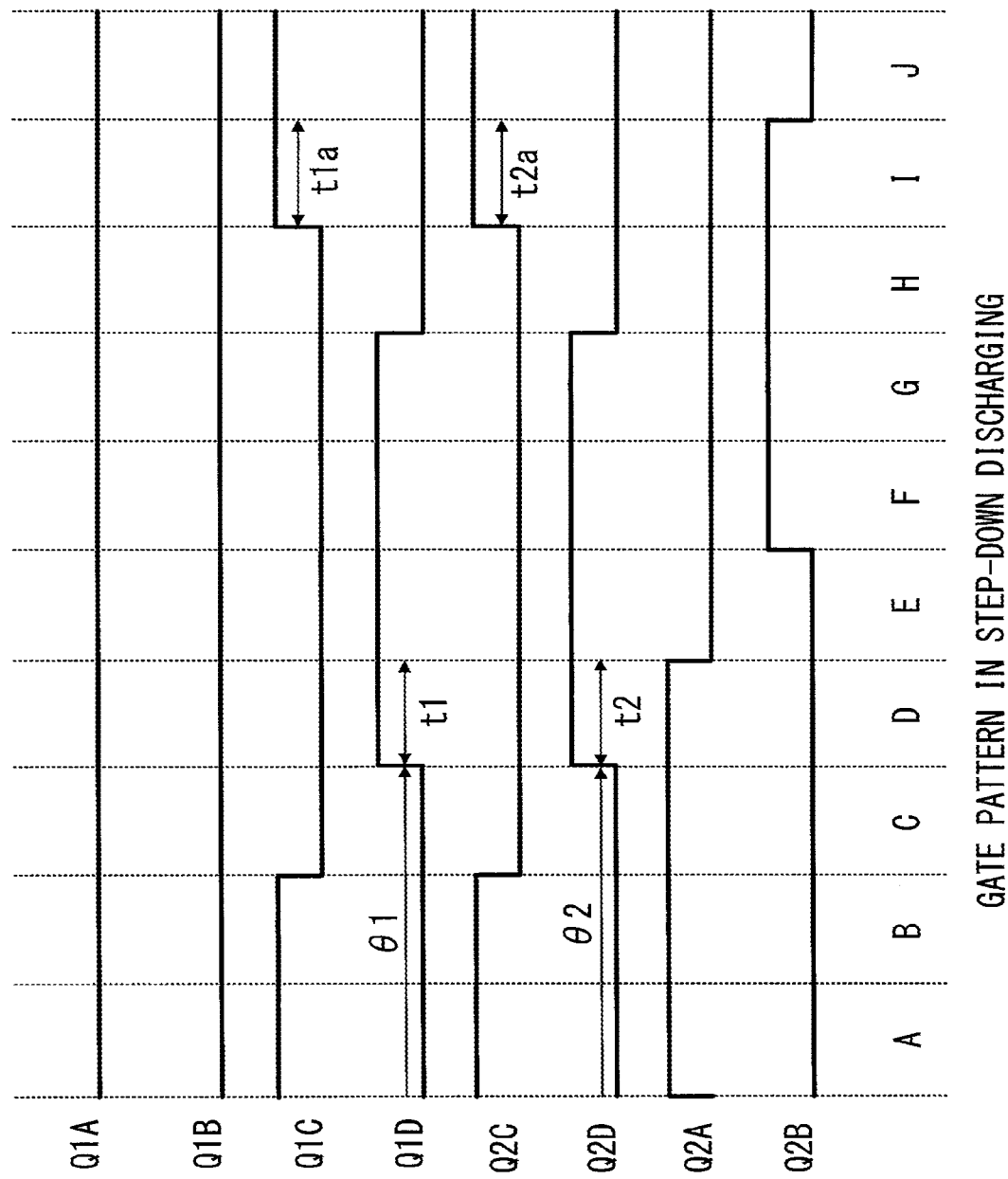
FIG. 5 is a drive signal waveform diagram in the case of step-down discharging of the DC/DC converter according to embodiment 1 of the present invention.
Figure 6:
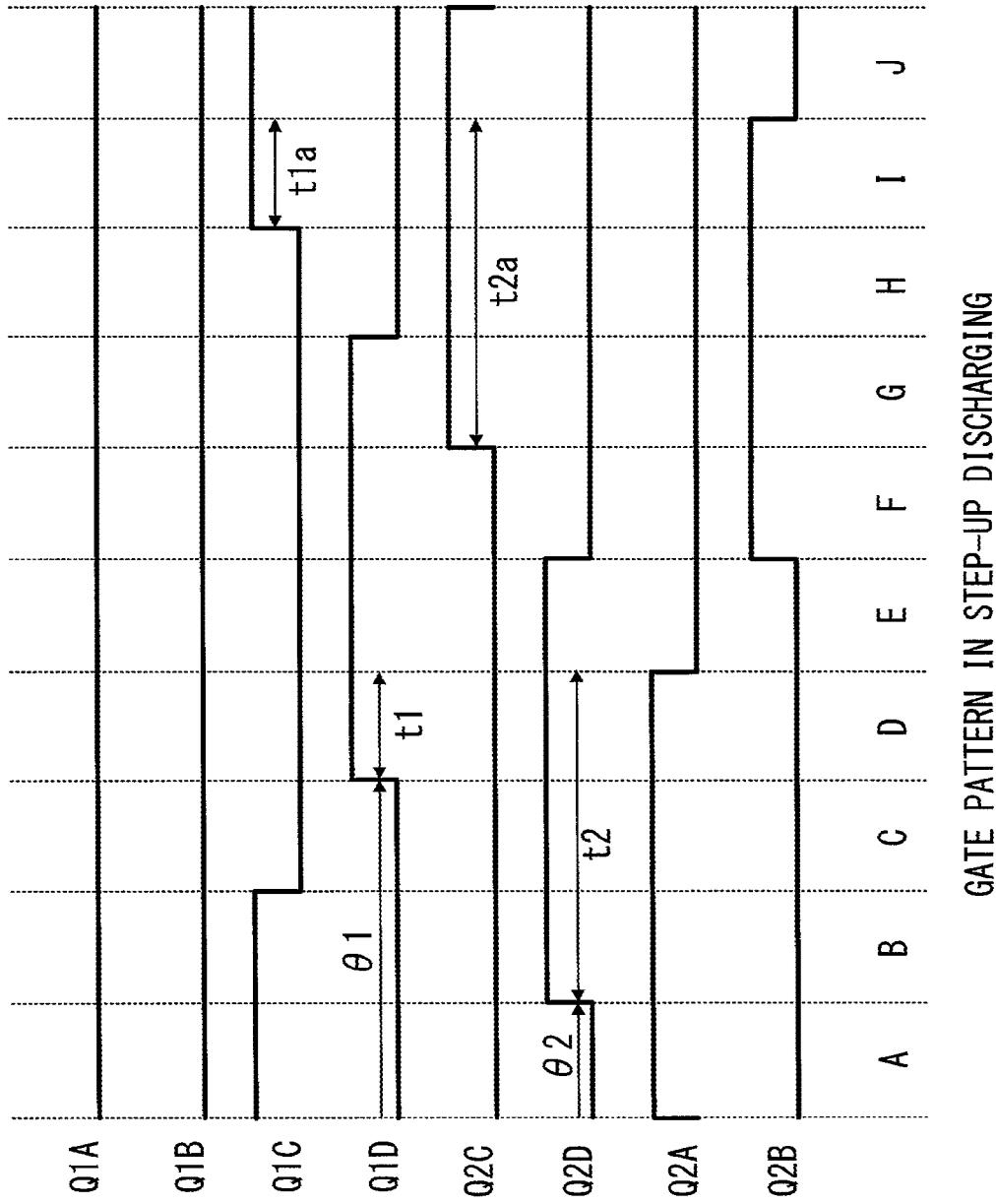
FIG. 6 is a drive signal waveform diagram in the case of step-up discharging of the DC/DC converter according to embodiment 1 of the present invention.

FIG. 5 shows waveforms of the drive signals 21a, 21b for the semiconductor switching elements Q of the first switching circuit 5 and the second switching circuit 8 in step-down discharging operation of the DC/DC converter 30a. FIG. 6 shows waveforms of the drive signals 21a, 21b for the semiconductor switching elements Q of the first switching circuit 5 and the second switching circuit 8 in step-up discharging operation of the DC/DC converter 30a.

The direction of operation of the DC/DC converter 30a in the case of step-down discharging is opposite to that in the case of step-down charging as shown in FIG. 4 and FIG. 5, and therefore the drive signals for the first switching circuit 5 and the drive signals for the second switching circuit 8 in the case of step-down charging are replaced with each other. The direction of operation of the DC/DC converter 30a in the case of step-up discharging is opposite to that in the case of step-up charging as shown in FIG. 3 and FIG. 6, and therefore the drive signals for the first switching circuit 5 and the drive signals for the second switching circuit 8 in the case of step-up charging are replaced with each other.

In discharging operation in which the DC/DC converter 30a transmits power from the DC power supply 2a to the common load 1, the first switching circuit 5 and the second switching circuit 8 are controlled as follows.

All the drive signals are generated using, as a reference, the second bridge circuit (Q2A, Q2B) in the second switching circuit 8 which is a power-transmitting-side circuit. Q1A and Q1B of the first bridge circuit (Q1A, Q1B) in the first switching circuit 5 are kept in an OFF state.

In three bridge circuits other than the first bridge circuit (Q1A, Q1B), Q1C, Q2A, Q2C on the positive side (high-voltage side) and Q1D, Q2B, Q2D on the negative side (low-voltage side) which compose the respective bridge circuits are controlled with an ON time ratio of 50%, except for short-circuit prevention time. In this case, at the time of switching of each semiconductor switching element Q in the power-transmitting-side circuit (second switching circuit 8), the control circuit 20 performs controls so that, within the short-circuit prevention time, voltage of the capacitor 13 connected in parallel to each semiconductor switching element Q increases to voltage of the second smoothing capacitor 7 or decreases to be close to zero voltage, thereby performing zero voltage switching.

A phase shift amount θ1 (first phase shift amount) for the drive signal for the first diagonal element Q1D relative to the phase of the drive signal for the second reference element Q2A (reference element of power-transmitting-side circuit), and a phase shift amount θ2 (second phase shift amount) for the drive signal for the second diagonal element Q2D relative to the phase of the drive signal for the second reference element Q2A, are determined in accordance with a duty cycle which is a control command. That is, the phase shift amounts θ1, θ2 are controlled in accordance with the duty cycle.

In step-down discharging shown in FIG. 5, the phase shift amount θ1 and the phase shift amount θ2 are equal to each other, and both phase shift amounts θ1, θ2 are changed in accordance with the duty cycle. In step-up discharging shown in FIG. 6, the phase shift amount θ2 is kept minimum and the phase shift amount θ1 is changed in accordance with the duty cycle.

As shown in FIG. 5 and FIG. 6, a diagonal ON time t2 during which Q2A and Q2D are both ON is determined by the phase shift amount θ2, and a diagonal ON time t2a during which Q2B and Q2C are both ON is also equal to the diagonal ON time t2.

In addition, for the first bridge circuit (Q1A, Q1B), the control circuit 20 assumes drive signals equal to those for the second bridge circuit (Q2A, Q2B), as virtual drive signals, and sets a period during which a virtual ON time of Q1A due to the virtual drive signal for Q1A and an ON time of Q1D overlap each other, as a virtual diagonal ON time t1. The virtual diagonal ON time t1 is determined by the phase shift amount θ1. It is noted that a virtual diagonal ON time t1a during which a virtual ON time of Q1B due to the virtual drive signal for Q1B and an ON time of Q1C overlap each other is also equal to the virtual diagonal ON time t1.

As described above, the DC/DC converter 30a performs bidirectional power transmission with four control modes, i.e., step-up charging, step-down charging, step-down discharging, and step-up discharging. Further, as described above, the phase shift amount θ1 for the drive signal for the first diagonal element Q1D and the phase shift amount θ2 for the drive signal for the second diagonal element Q2D relative to the phase of the drive signal for the reference element of the power-transmitting-side circuit are controlled in accordance with the duty cycle. The reference element of the power-transmitting-side circuit is the first reference element Q1A in the case of charging, and is the second reference element Q2A in the case of discharging.

Figure 7:
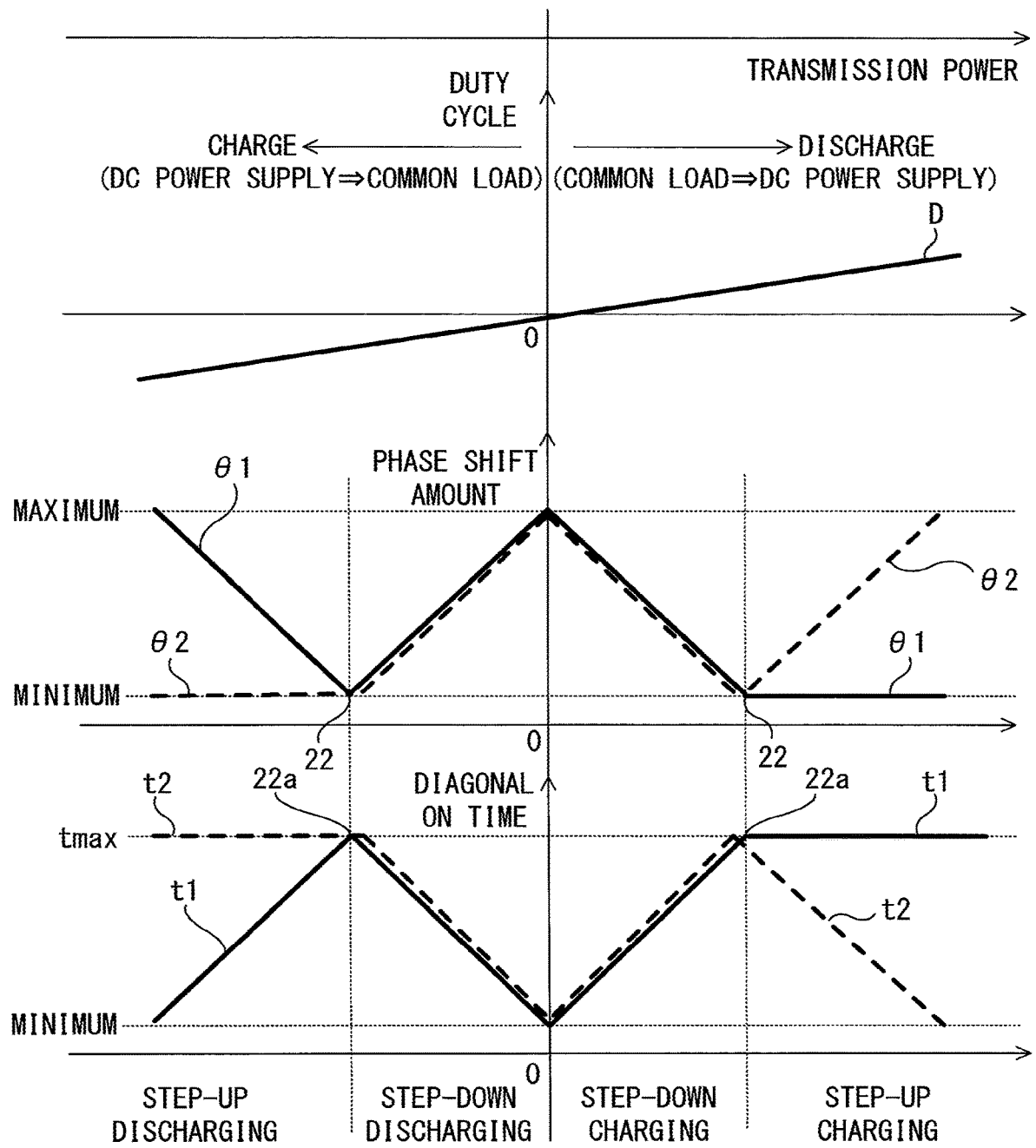
FIG. 7 is a waveform diagram illustrating basic control operation of the DC/DC converter according to embodiment 1 of the present invention.

FIG. 7 is a waveform diagram illustrating basic control operation of the DC/DC converter 30a, and shows the phase shift amounts θ1, θ2 according to the duty cycle, and the diagonal ON times (virtual diagonal ON times) t1, t2. In this case, power in the charging direction is positive.

It is noted that, here, in order to show basic control operation, the case where the duty cycle is determined in proportion to transmission power is shown. However, as described later, the calculated duty cycle is corrected and the corrected duty cycle is used.

Hereinafter, control in the case of charging will be described with reference to FIG. 7. Control in the case of discharging is obtained by merely reversing the power transmission direction, and therefore description thereof is omitted.

In control in the case of step-up charging, the control circuit 20 sets the diagonal ON time t1 (=t1a) to a maximum ON time tmax so as to maximize the period during which voltage is applied to the first winding 3a of the transformer 3. The maximum ON time tmax is set on the basis of the short-circuit prevention time required for each semiconductor switching element Q of the first switching circuit 5 to perform zero voltage switching. At this time, the phase shift amount θ1 is minimum and is equal to the short-circuit prevention time.

In the case of step-up charging, the phase shift amount θ2 is equal to or greater than the phase shift amount θ1, and in the diagonal ON time (t1, t1a) during which voltage is applied to the transformer 3, a period during which the second reactor 10 is excited by the second switching circuit 8 is present. The control circuit 20 performs control such that, from a first reference point 22 as a base point at which the phase shift amounts θ1, θ2 are both minimum (short-circuit prevention time), as the duty cycle increases, the phase shift amount θ2 is increased while the phase shift amount θ1 is kept minimum.

When the phase shift amounts θ1, θ2 are both at the reference point 22 at which both of them are minimum (short-circuit prevention time), the diagonal ON time t1 and the virtual diagonal ON time t2 are at a point 22a at which both of them are the maximum ON time tmax. The control circuit 20 performs control such that, from the point 22a as a base point, as the duty cycle increases, the virtual diagonal ON time t2 is decreased while the diagonal ON time t1 is kept at the maximum ON time tmax.

In the case of step-down charging, the phase shift amount θ1 and the phase shift amount θ2 are equal to each other, and both phase shift amounts θ1, θ2 are changed in accordance with the duty cycle.

When the phase shift amounts θ1, θ2 are maximum, the diagonal ON time t1 and the virtual diagonal ON time t2 are both minimum (short-circuit prevention time) and power transmission is not performed. In the case of step-down charging, the control circuit 20 performs control such that, when the duty cycle is 0, the phase shift amounts θ1, θ2 are maximum, and as the duty cycle increases, the phase shift amounts θ1, θ2 are both decreased. At this time, the diagonal ON time t1 and the virtual diagonal ON time t2 increase.

When the phase shift amounts θ1, θ2 are both maximum, the control circuit 20 switches from control of keeping the second bridge (Q2A, Q2B) in an OFF state to control of keeping the first bridge (Q1A, Q1B) in an OFF state, thereby switching the power transmission direction. At the time of this switchover, the diagonal ON times (virtual diagonal ON times) t1, t2 are both minimum (short-circuit prevention time), i.e., power transmission is not being performed, and therefore there is no influence due to the switchover and it is possible to smoothly perform the switchover.

Figure 8:
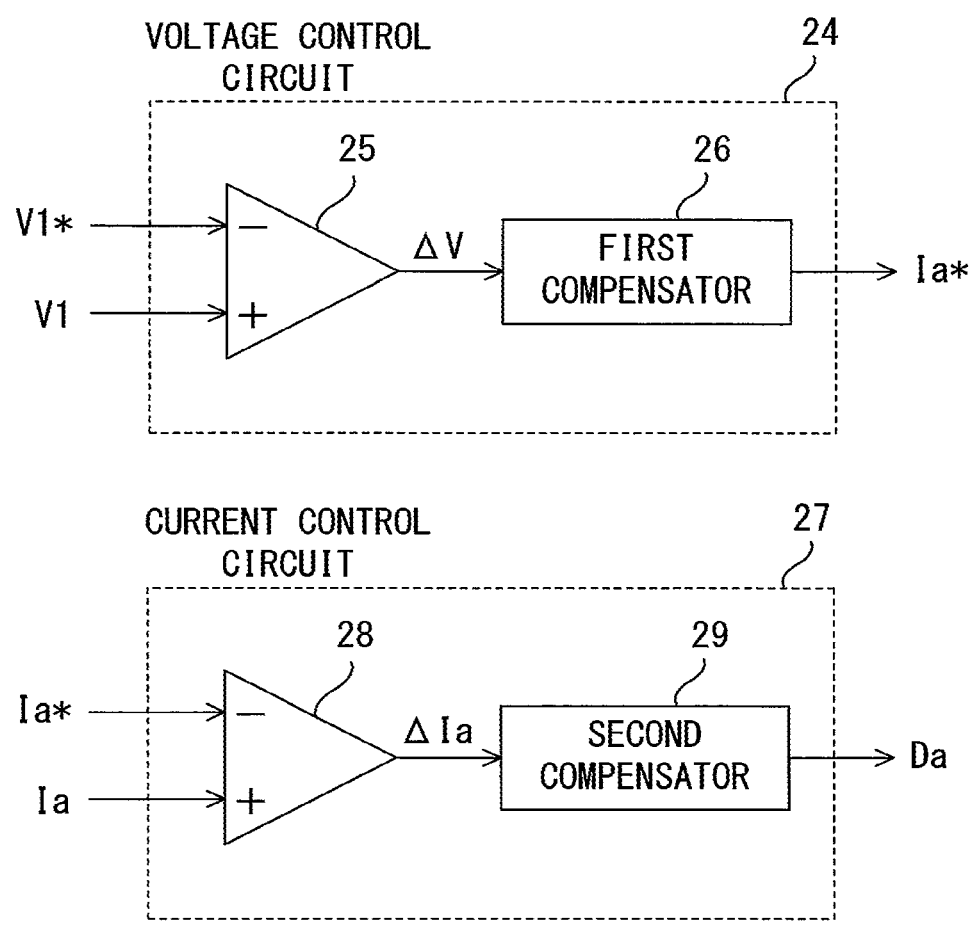
FIG. 8 is a control block diagram illustrating a control circuit of the DC/DC converter according to embodiment 1 of the present invention.
Figure 9:
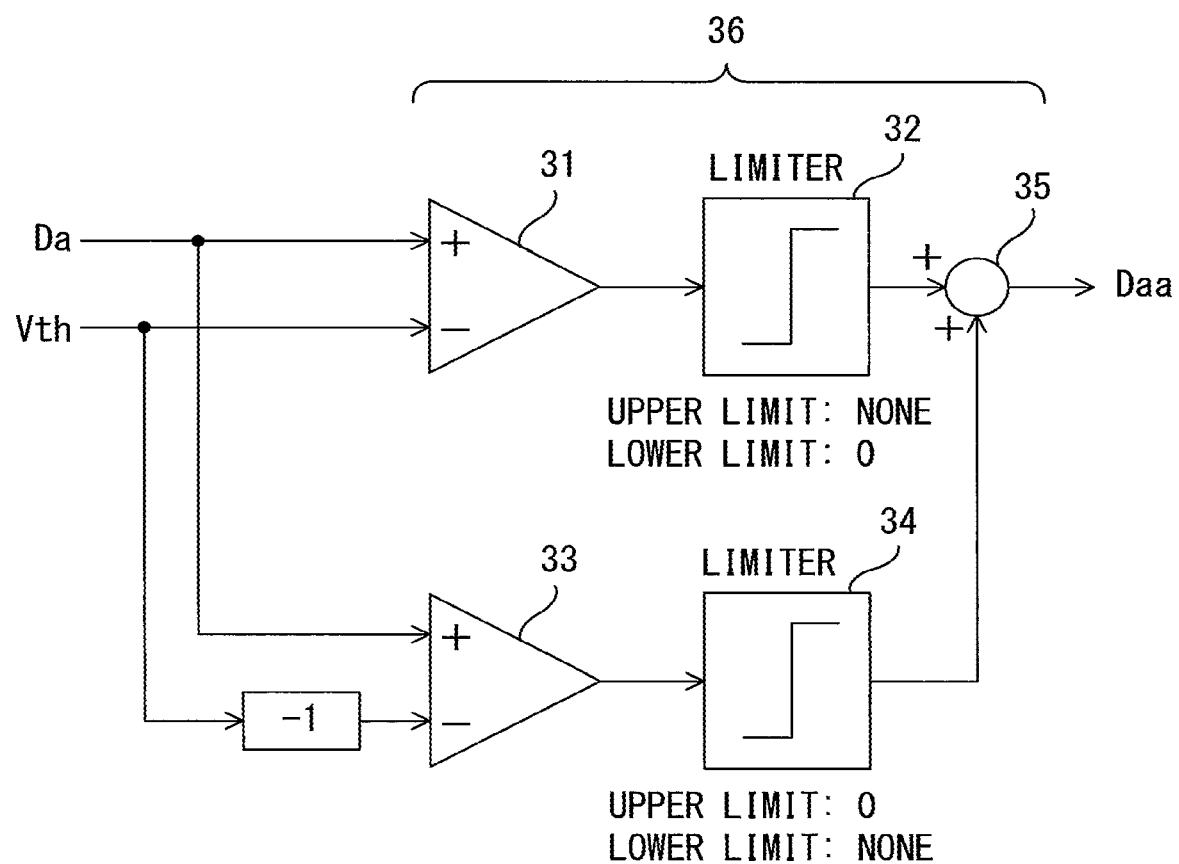
FIG. 9 is a control block diagram illustrating the control circuit of the DC/DC converter according to embodiment 1 of the present invention.

FIG. 8 and FIG. 9 are control block diagrams illustrating operation of the control circuit 20 in the DC/DC converter 30a. The control circuit 20 includes a voltage control circuit 24, a current control circuit 27, and a correction circuit 36. In this case, the voltage control circuit 24 and the current control circuit 27 compose a voltage control unit of the control circuit 20.

FIG. 8 shows the voltage control circuit 24 and the current control circuit 27. FIG. 9 shows the correction circuit 36 for correcting a duty cycle calculated by the current control circuit 27.

As described above, voltage V1 of the common load 1 and current Ia between the second switching circuit 8 and the DC power supply 2a are detected by the voltage detector 16 and the current detector 17, and then inputted to the control circuit 20.

As shown in FIG. 8, the voltage control circuit 24 includes an error detector 25 and a first compensator 26. The voltage control circuit 24 receives given target voltage V1* for the common load 1 and the detected voltage V1, and the error detector 25 subtracts the target voltage V1* from the voltage V1 and outputs a voltage deviation ΔV. Then, the first compensator 26 calculates target current Ia* for current Ia so that the voltage deviation ΔV becomes 0.

The current control circuit 27 includes an error detector 28 and a second compensator 29. The current control circuit 27 receives the target current Ia* outputted from the voltage control circuit 24 and the detected current Ia, and the error detector 28 subtracts the target current Ia* from the current Ia and outputs a current deviation ΔIa. Then, the second compensator 29 calculates a duty cycle Da for the DC/DC converter 30a so that the current deviation ΔIa becomes 0.

The first compensator 26 and the second compensator 29 are each configured by connecting proportional control and a filter (phase leading compensation, phase lagging compensation, low-pass filter, etc.) in series. The gain of the proportional control roughly determines the control response, and the filter makes improvements on stability and steady-state deviation. It is noted that the first compensator 26 and the second compensator 29 do not use integral control and therefore do not continue to accumulate the voltage deviation and the current deviation.

In the case where the duty cycle Da is calculated as described above, if voltage V1 of the common load 1 is greater than target voltage V1*, target current Ia* becomes a positive value and the duty cycle Da also becomes a positive value. If voltage V1 of the common load 1 is equal to or smaller than target voltage V1*, target current Ia* becomes equal to or smaller than 0 and the duty cycle Da also becomes equal to or smaller than 0.

If the detected values of the voltages V1 of the plurality of DC/DC converters 30a to 30e are all equal to each other, the polarities of target currents Ia* to Ie* coincide with each other and the polarities of duty cycles Da to De also coincide with each other. In this case, currents Ia to Ie are adjusted at the same polarity.

However, in practice, when the control circuit 20 of each DC/DC converter 30a to 30e acquires voltage V1, detection error Verr within a certain voltage range occurs.

Figure 10:
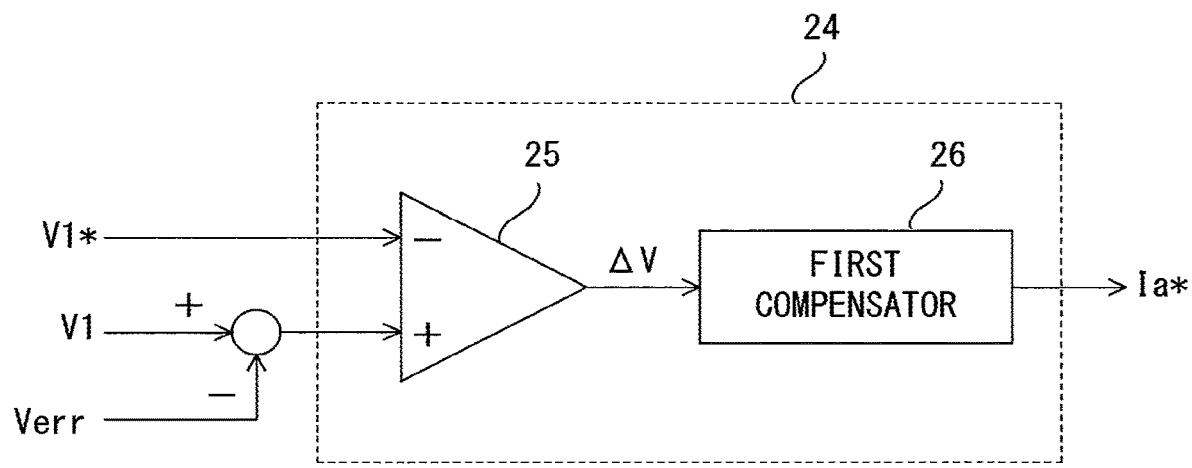
FIG. 10 is a control block diagram illustrating a voltage control circuit of the DC/DC converter according to embodiment 1 of the present invention.

As shown in FIG. 10, the voltage control circuit 24 receives voltage V1 of the common load 1 to or from which the detection error Verr has been added or subtracted. Then, the voltage V1 to or from which the detection error Verr has been added or subtracted is inputted to the error detector 25, and the first compensator 26 calculates target current Ia* on the basis of the voltage deviation ΔV including the detection error Verr.

The detection error Verr is attributed to characteristics errors of parts of the DC/DC converters 30a to 30e, and the value and the polarity of the detection error Verr vary among the DC/DC converters 30a to 30e. Therefore, the target currents Ia* to Ie* calculated by the control circuits 20 of the DC/DC converters 30a to 30e might also become different from each other and the polarities thereof might also become different from each other.

Therefore, the respective control circuits 20 use values obtained by the correction circuits 36 correcting the duty cycles Da to De calculated by the current control circuits 27 on the basis of target currents Ia* to Ie*.

As shown in FIG. 9, the correction circuit 36 includes difference detectors 31, 33, limiters 32, 34, and an adder 35.

If the duty cycle is controlled at 0, power transmission is not performed and current Ia also becomes 0. A region of the duty cycle in which the polarity of current Ia is likely to be inverted due to the detection error Verr is a vicinity of 0. This region is set as a range of −Vth to Vth, using a positive value Vth. Since the value Vth is attributed to the detection error Verr, for example, the value Vth is set as follows, using a maximum value ΔE of detection error.

$$Vth = \Delta E \times \text{gain of first compensator 26} \times \text{gain of second compensator 29}$$

The maximum value ΔE of detection error is determined on the basis of characteristics of parts of hardware used for the voltage detector 16.

The difference detector 31 receives the duty cycle Da calculated by the current control circuit 27 and the set value Vth, and outputs a value (Da−Vth) obtained by subtracting the set value Vth from the duty cycle Da. The limiter 32 limits the output of the difference detector 31 by a lower limit 0 and outputs the resultant value.

The difference detector 33 receives the duty cycle Da calculated by the current control circuit 27 and a value (−Vth) obtained by inverting the polarity of the set value Vth, and outputs a value (Da+Vth) obtained by subtracting the value (−Vth) from the duty cycle Da. The limiter 34 limits the output of the difference detector 33 by an upper limit 0 and outputs the resultant value. The adder 35 sums the outputs of the two limiters 32, 34 and outputs a duty cycle Daa.

Figure 11:
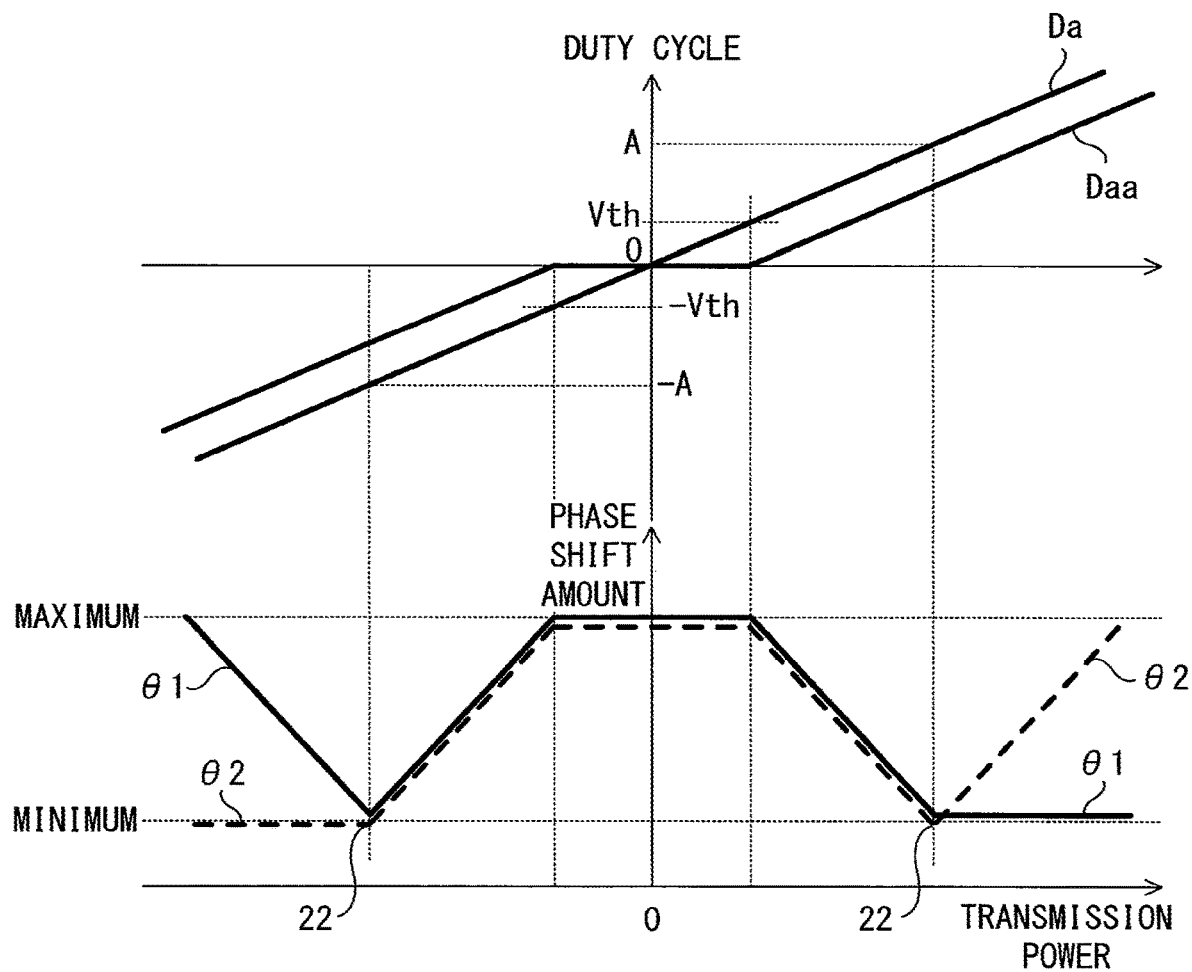
FIG. 11 is a waveform diagram illustrating control operation of the DC/DC converter according to embodiment 1 of the present invention.

FIG. 11 is a waveform diagram illustrating control operation of the DC/DC converter 30a. As shown in FIG. 11, the duty cycle Da calculated by the current control circuit 27 is corrected to the duty cycle Daa. That is, correction is performed such that, when the absolute value (magnitude) of the duty cycle Da is smaller than Vth, the value is fixed at 0, and otherwise, the value is decreased by Vth, whereby the duty cycle Daa is generated.

In the region in which the absolute value of the duty cycle Da is smaller than Vth, i.e., the duty cycle Daa is fixed at 0, the phase shift amounts θ1, θ2 determined in accordance with the duty cycle Daa are fixed at the maximum value.

That is, the maximum value fixed region is interposed at the center part of the waveforms of the phase shift amounts θ1, θ2 shown in FIG. 7. In the case where the magnitude of the duty cycle Da is equal to or greater than Vth, in a region not exceeding a reference point A, −A of the duty cycle Da at which the phase shift amounts θ1, θ2 are both minimum, the phase shift amounts θ1, θ2 are decreased by an equal amount as the magnitude of the duty cycle increases. Then, if the duty cycle Da exceeds the reference point A, −A, one of the phase shift amounts θ1, θ2 is kept minimum and the other one is increased as the magnitude of the duty cycle increases. It is noted that the reference points A, −A of the duty cycle Da indicate the values of the duty cycle Da that correspond to the reference points 22 of the phase shift amounts θ1, θ2.

As described above, in the control circuits 20 of the DC/DC converters 30a to 30e, the duty cycles Da to De calculated by the current control circuits 27 are corrected in the above manner. Then, on the basis of the corrected duty cycles Daa to Dee, the DC/DC converters 30a to 30e are subjected to phase shift control.

Thus, in the region in which the polarities of the currents Ia to Ie are likely to be inverted due to detection error Verr, the duty cycles Daa to Dee are fixed at 0 and currents Ia to Ie are also controlled to be 0. Therefore, the polarities of currents Ia to Ie of the plurality of DC/DC converters 30a to 30e can be prevented from being different from each other, and thus circulation current is suppressed and current balance is improved, whereby loss reduction can be achieved.

Figure 12:
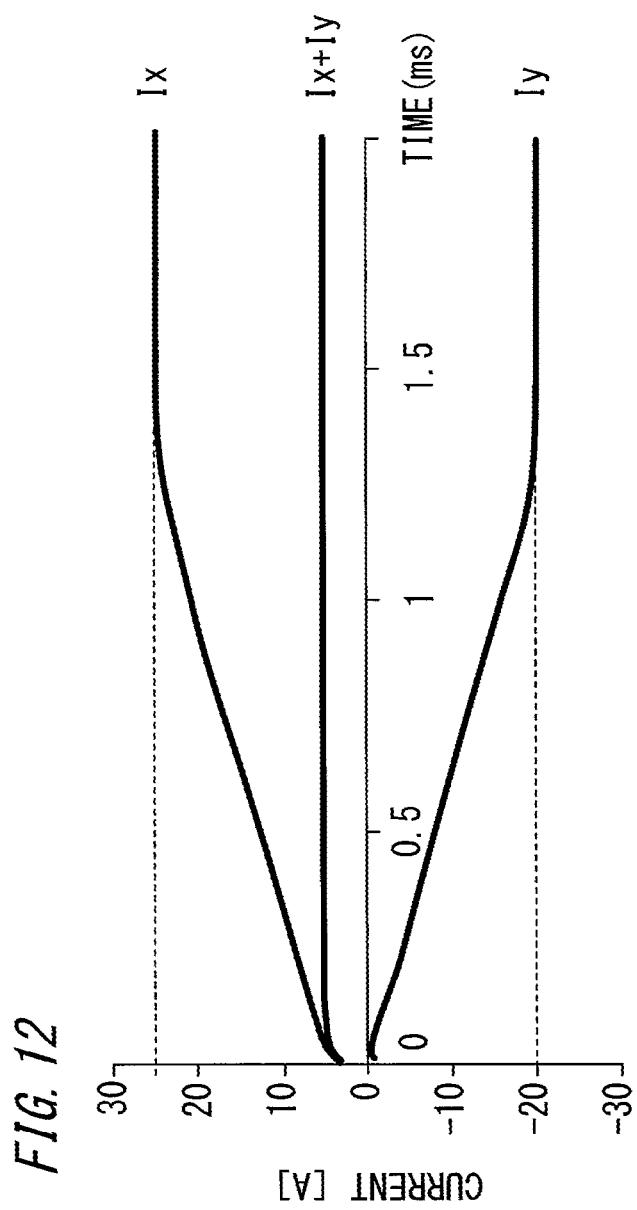
FIG. 12 is a waveform diagram of output currents of a plurality of DC/DC converters in a comparative example.

FIG. 12 shows output currents in a comparative example in which two DC/DC converters are controlled without correction of duty cycles.

Total current Ix+Iy of currents Ix, Iy from the two DC/DC converters does not vary, but for the sake of the total current of 5 A, one of the DC/DC converters outputs current of 25 A and the other DC/DC converter outputs current of −20 A. In this case, as compared to the total current Ix+Iy which contributes to power transmission of the parallel power supply device, currents Ix, Iy of the respective DC/DC converters are large and thus it is found that burdens on the DC/DC converters are great and insufficient operation is performed.

If inversion of the polarity of current due to detection error Verr occurs in both DC/DC converters, the total current of 5 A cannot be ensured and thus reliable operation as the parallel power supply device cannot be performed.

As described above, in the present embodiment, the duty cycles calculated by the current control circuits 27 are corrected to perform phase shift control for the DC/DC converters 30a to 30e. Therefore, the polarities of the output currents (Ia to Ie) are prevented from becoming different from each other and thus output currents can be balanced, whereby loss reduction can be achieved. In addition, since the control circuits 20 control the respective DC/DC converters 30a to 30e independently, the parallel power supply device 100 has a device configuration that is high in the degree of freedom in provision or addition of the DC/DC converters.

The region of −Vth to Vth in which the duty cycle is fixed at 0 is determined on the basis of the maximum value ΔE of detection error Verr of voltage V1. Therefore, efficient and effective correction can be performed and inversion of the polarity of current due to detection error Verr can be suppressed.

In the above embodiment, the case where the control circuit 20 has the correction circuit 36 to correct the duty cycle Da and the phase shift amounts θ1, θ2 are determined using the duty cycle Daa outputted from the correction circuit 36, has been shown. However, another configuration may be employed. For example, the phase shift amounts θ1, θ2 corresponding to the duty cycle Daa may be stored in association with the duty cycle Da in advance and the stored values may be used. Alternatively, the phase shift amounts θ1, θ2 (see FIG. 7) corresponding to the duty cycle Da may be directly corrected to the phase shift amounts θ1, θ2 corresponding to the duty cycle Daa. In any case, the phase shift amounts θ1, θ2 are determined using the corrected duty cycle Daa and the same effect is obtained.

Embodiment 2

Next, embodiment 2 of the present invention will be described.

In the above embodiment 1, the voltage control unit in the control circuit 20 is composed of the voltage control circuit 24 and the current control circuit 27. However, in the present embodiment 2, a voltage control circuit 24A as the voltage control unit calculates the duty cycle of the DC/DC converter.

Figure 13:
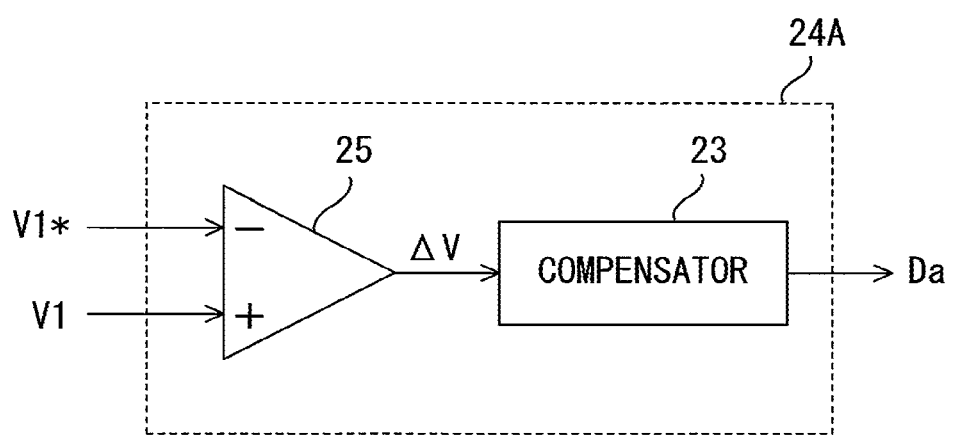
FIG. 13 is a control block diagram illustrating a control circuit of a DC/DC converter according to embodiment 2 of the present invention.
Figure 14:
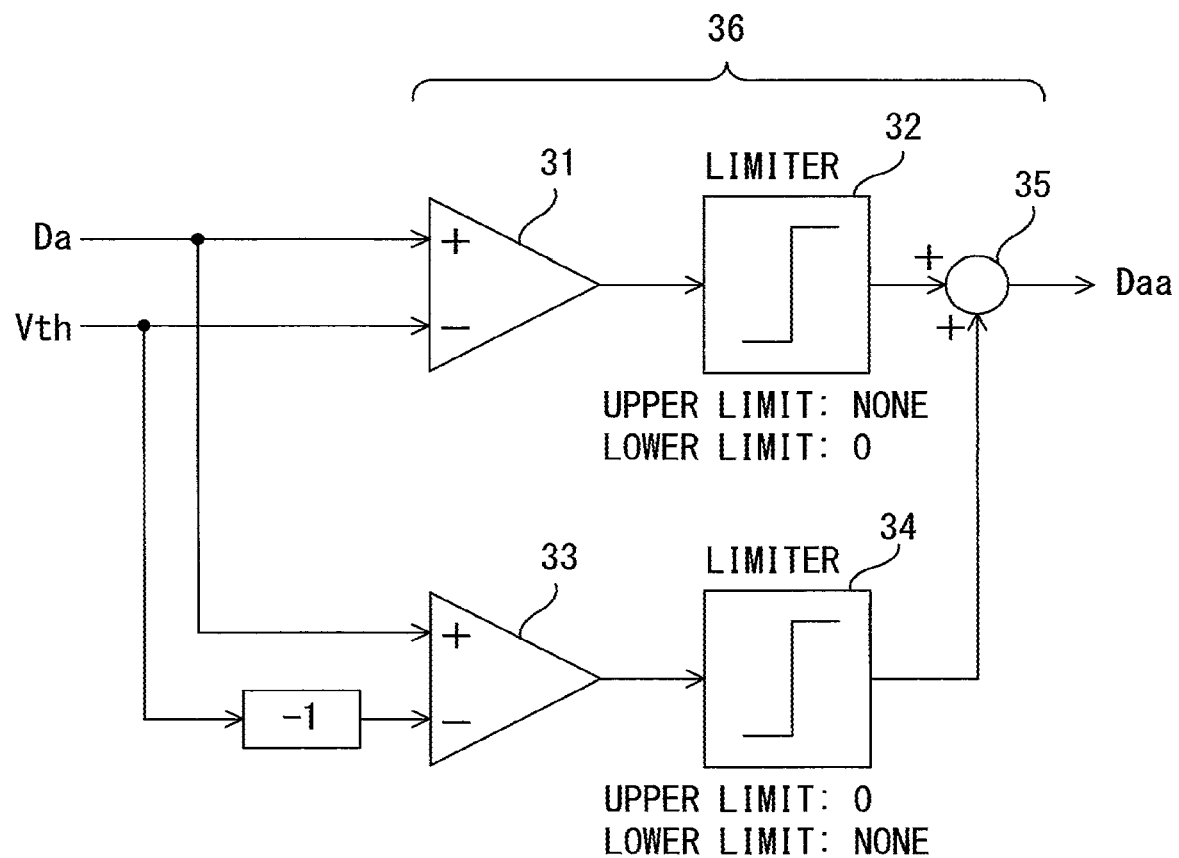
FIG. 14 is a control block diagram illustrating the control circuit of the DC/DC converter according to embodiment 2 of the present invention.

FIG. 13 and FIG. 14 are control block diagrams illustrating operation of the control circuit 20 in the DC/DC converter 30a according to the present embodiment 2. The control circuit 20 includes the voltage control circuit 24A and the correction circuit 36. FIG. 13 shows the voltage control circuit 24A, and FIG. 14 shows the correction circuit 36 for correcting the duty cycle.

In this case, current Ia between the second switching circuit 8 and the DC power supply 2a is not used for control, and therefore the current detector 17 is not needed. The other configurations are the same as in the above embodiment 1.

As shown in FIG. 13, voltage V1 of the common load 1 is detected by the voltage detector 16 and then inputted to the voltage control circuit 24A in the control circuit 20. The voltage control circuit 24A includes the error detector 25 and a compensator 23. The voltage control circuit 24A receives given target voltage V1* for the common load 1 and the detected voltage V1, and the error detector 25 subtracts the target voltage V1* from the voltage V1 and outputs a voltage deviation ΔV. Then, the compensator 23 calculates the duty cycle Da for the DC/DC converter 30a so that the voltage deviation ΔV becomes 0.

The compensator 23 is configured by connecting proportional control and a filter (phase leading compensation, phase lagging compensation, low-pass filter, etc.) in series. The gain of the proportional control roughly determines the control response, and the filter makes improvements on stability and steady-state deviation. It is noted that the compensator 23 does not use integral control and therefore does not continue to accumulate the voltage deviation.

In the case where the duty cycle Da is calculated as described above, if voltage V1 of the common load 1 is greater than target voltage V1*, the duty cycle Da becomes a positive value. If voltage V1 of the common load 1 is equal to or smaller than target voltage V1*, the duty cycle Da becomes equal to or smaller than 0.

If the detected values of the voltages V1 of the plurality of DC/DC converters 30a to 30e are all equal to each other, the polarities of duty cycles Da to De coincide with each other. In this case, the voltages V1 of the plurality of DC/DC converters 30a to 30e are adjusted at the same polarity, i.e., the increase/decrease directions thereof are adjusted to be the same.

However, in practice, when the control circuit 20 of each DC/DC converter 30a to 30e acquires voltage V1, detection error Verr within a certain voltage range occurs.

Figure 15:
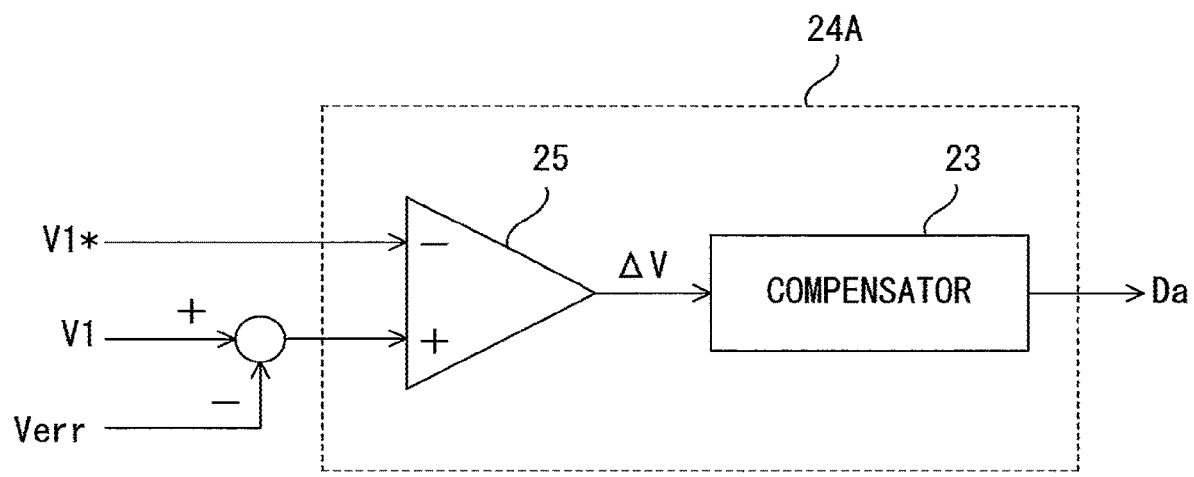
FIG. 15 is a control block diagram illustrating a voltage control circuit of the DC/DC converter according to embodiment 2 of the present invention.

As shown in FIG. 15, the voltage control circuit 24A receives voltage V1 of the common load 1 to or from which the detection error Verr has been added or subtracted. Then, the voltage V1 to or from which the detection error Verr has been added or subtracted is inputted to the error detector 25, and the compensator 23 calculates the duty cycle Da on the basis of the voltage deviation ΔV including the detection error Verr.

The detection error Verr is attributed to characteristics errors of parts of the DC/DC converters 30a to 30e, and the value and the polarity of the detection error Verr vary among the DC/DC converters 30a to 30e. Therefore, the duty cycles Da to De calculated by the control circuits 20 of the DC/DC converters 30a to 30e might also become different from each other.

Therefore, the respective control circuits 20 use values obtained by the correction circuits 36 correcting the duty cycles Da to De calculated by the voltage control circuits 24A.

As shown in FIG. 14, the correction circuit 36 includes difference detectors 31, 33, limiters 32, 34, and an adder 35.

If the duty cycle is controlled at 0, power transmission is not performed and also voltage V1 is not adjusted, i.e., the adjustment amount of voltage V1 is 0. A region of the duty cycle in which the polarity of the adjustment amount of voltage V1 is likely to be inverted due to the detection error Verr is a vicinity of 0. This region is set as a range of −Vth to Vth, using a positive value Vth. Since the value Vth is attributed to the detection error Verr, for example, the value Vth is set as follows, using a maximum value ΔE of detection error.

$$Vth = \Delta E \times \text{gain of compensator 23}$$

The maximum value ΔE of detection error is determined on the basis of characteristics of parts of hardware used for the voltage detector 16.

The difference detector 31 receives the duty cycle Da calculated by the voltage control circuit 24A and the set value Vth, and outputs a value (Da−Vth) obtained by subtracting the set value Vth from the duty cycle Da. The limiter 32 limits the output of the difference detector 31 by a lower limit 0 and outputs the resultant value.

The difference detector 33 receives the duty cycle Da calculated by the voltage control circuit 24A and a value (−Vth) obtained by inverting the polarity of the set value Vth, and outputs a value (Da+Vth) obtained by subtracting the value (−Vth) from the duty cycle Da. The limiter 34 limits the output of the difference detector 33 by an upper limit 0 and outputs the resultant value. The adder 35 sums the outputs of the two limiters 32, 34 and outputs a duty cycle Daa.

The control operation of the DC/DC converter 30a controlled as described above is represented by the waveform diagram shown in FIG. 11 as in the above embodiment 1. That is, the duty cycle Da calculated by the voltage control circuit 24A is corrected to the duty cycle Daa. Correction is performed such that, when the absolute value (magnitude) of the duty cycle Da is smaller than Vth, the value is fixed at 0, and otherwise, the value is decreased by Vth, whereby the duty cycle Daa is generated.

In the region in which the absolute value of the duty cycle Da is smaller than Vth, i.e., the duty cycle Daa is fixed at 0, the phase shift amounts θ1, θ2 determined in accordance with the duty cycle Daa are fixed at the maximum value.

That is, the maximum value fixed region is interposed at the center part of the waveforms of the phase shift amounts θ1, θ2 shown in FIG. 7. In the case where the magnitude of the duty cycle Da is equal to or greater than Vth, in a region not exceeding a reference point A, −A of the duty cycle Da at which the phase shift amounts θ1, θ2 are both minimum, the phase shift amounts θ1, θ2 are decreased by an equal amount as the magnitude of the duty cycle increases. Then, if the duty cycle Da exceeds the reference point A, −A, one of the phase shift amounts θ1, θ2 is kept minimum and the other one is increased as the magnitude of the duty cycle increases. It is noted that the reference points A, −A of the duty cycle Da indicate the values of the duty cycle Da that correspond to the reference points 22 of the phase shift amounts θ1, θ2.

As described above, in the control circuits 20 of the DC/DC converters 30a to 30e, the duty cycles Da to De calculated by the voltage control circuits 24A are corrected in the above manner. Then, on the basis of the corrected duty cycles Daa to Dee, the DC/DC converters 30a to 30e are subjected to phase shift control.

Thus, in the region in which the polarities of the adjustment amounts of voltages V1 are likely to be inverted due to detection error Verr, the duty cycles Daa to Dee are fixed at 0 and the adjustment amounts of voltages V1 are also controlled to be 0. Therefore, the polarities of the adjustment amounts of the voltages V1 can be prevented from becoming different among the plurality of DC/DC converters 30a to 30e, that is, the voltages V1 can be adjusted in the same increase/decrease direction. Therefore, the polarities of output currents of the DC/DC converters 30a to 30e can be prevented from becoming different from each other, and thus circulation current is suppressed and current balance is improved, whereby loss reduction can be achieved.

Embodiment 3

Next, embodiment 3 of the present invention will be described.

Figure 16:
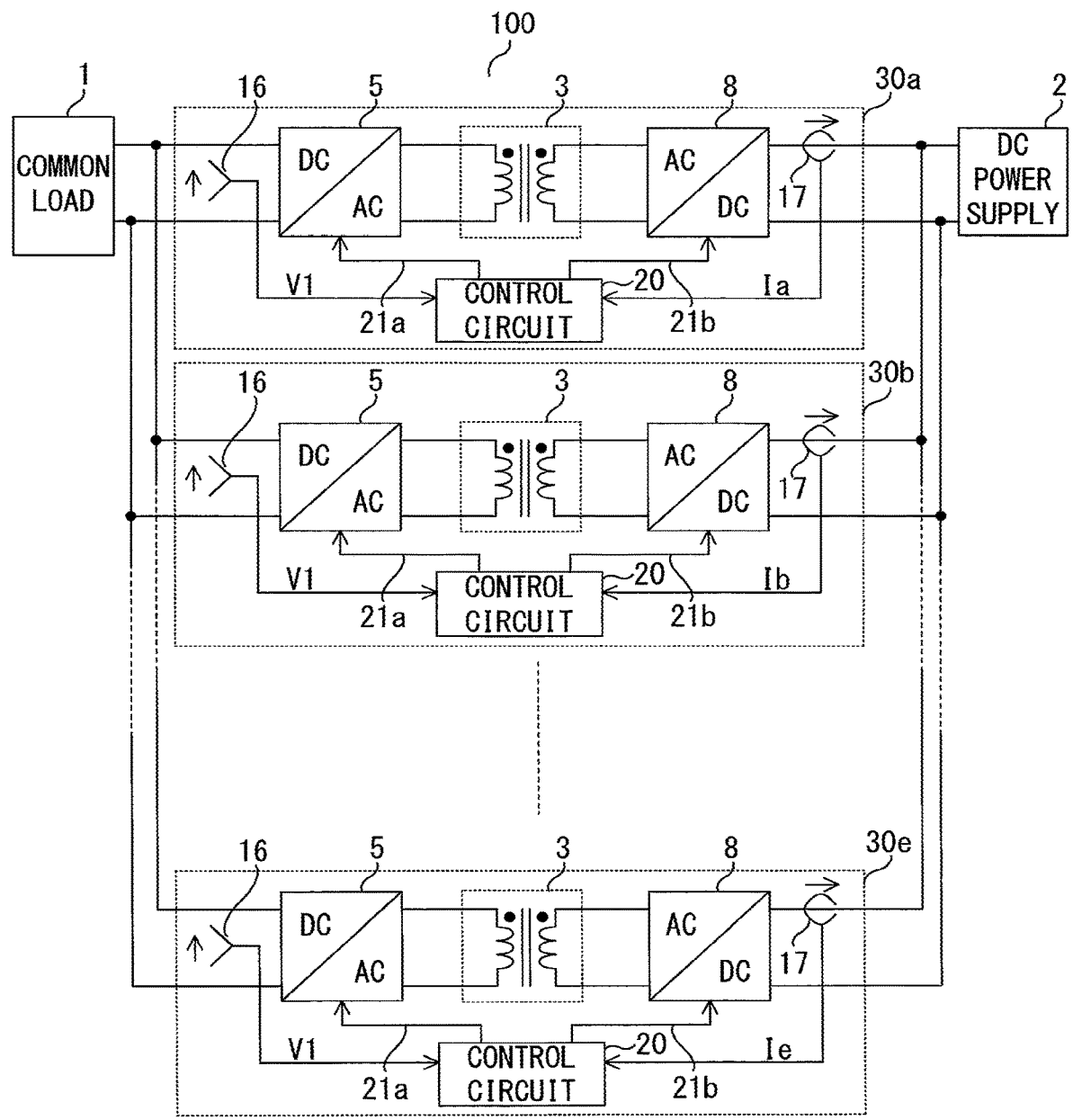
FIG. 16 is a schematic configuration diagram of a parallel power supply device according to embodiment 3 of the present invention.

FIG. 16 is a diagram showing the schematic configuration of a parallel power supply device according to embodiment 3 of the present invention.

In the above embodiments 1, 2, the DC/DC converters 30a to 30e are respectively connected to the DC power supplies 2a to 2e. However, in the present embodiment 3, the DC/DC converters 30a to 30e are connected to a common DC power supply 2. The other configurations are the same as in the above embodiment 1 (or embodiment 2). Also in this case, the DC/DC converters 30a to 30e operate in the same manner as in the above embodiment 1 (or embodiment 2) and the same effect is obtained.

Figure 17:
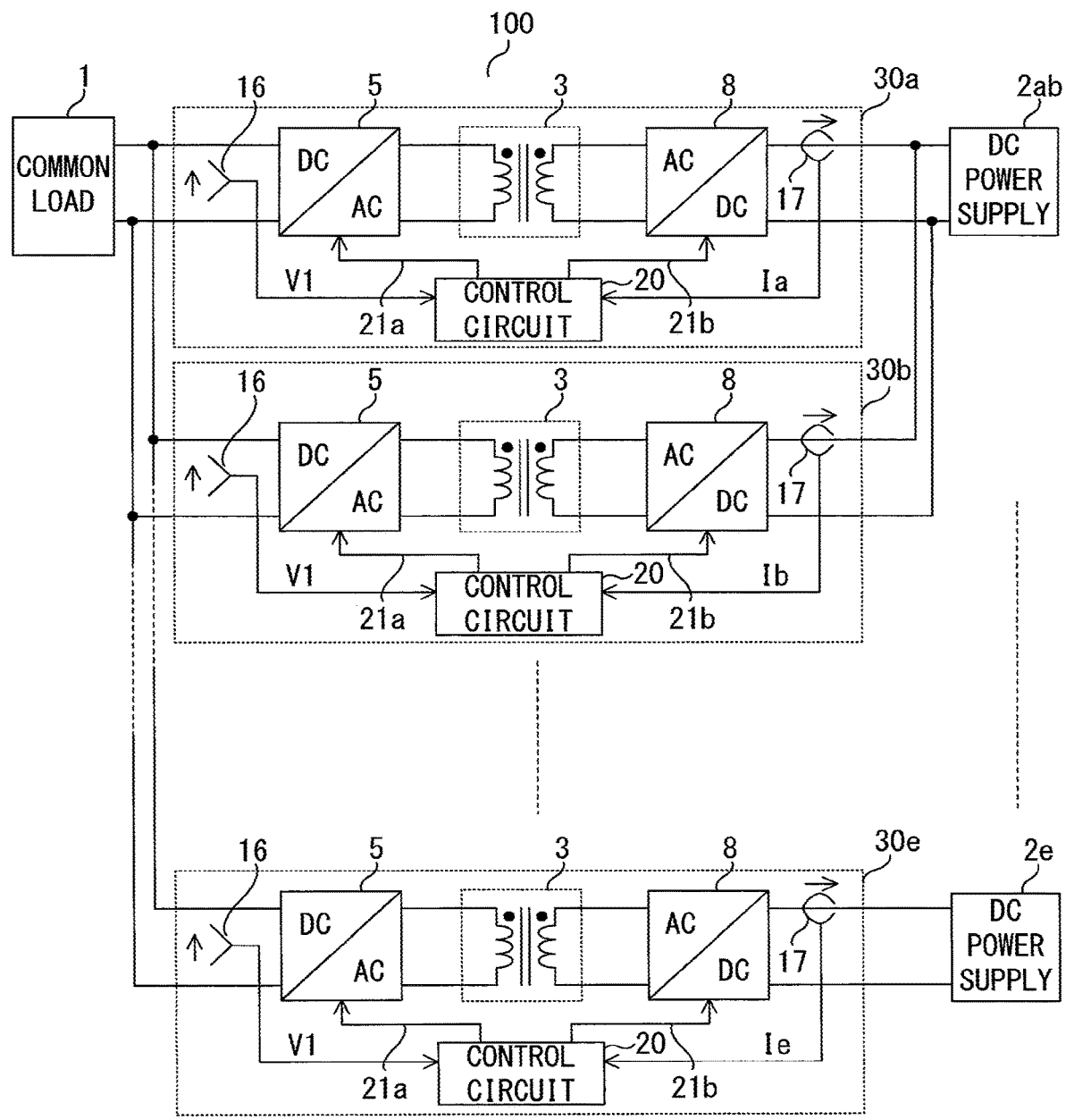
FIG. 17 is a schematic configuration diagram of a parallel power supply device according to another example of embodiment 3 of the present invention.

As shown in FIG. 17, of the DC/DC converters 30a to 30e, a plurality of DC/DC converters 30a, 30b may be connected to a common DC power supply 2ab, and the other DC/DC converters 30c to 30e may be respectively connected to the DC power supplies 2c to 2e.

Embodiment 4

Next, embodiment 4 of the present invention will be described.

Figure 18:
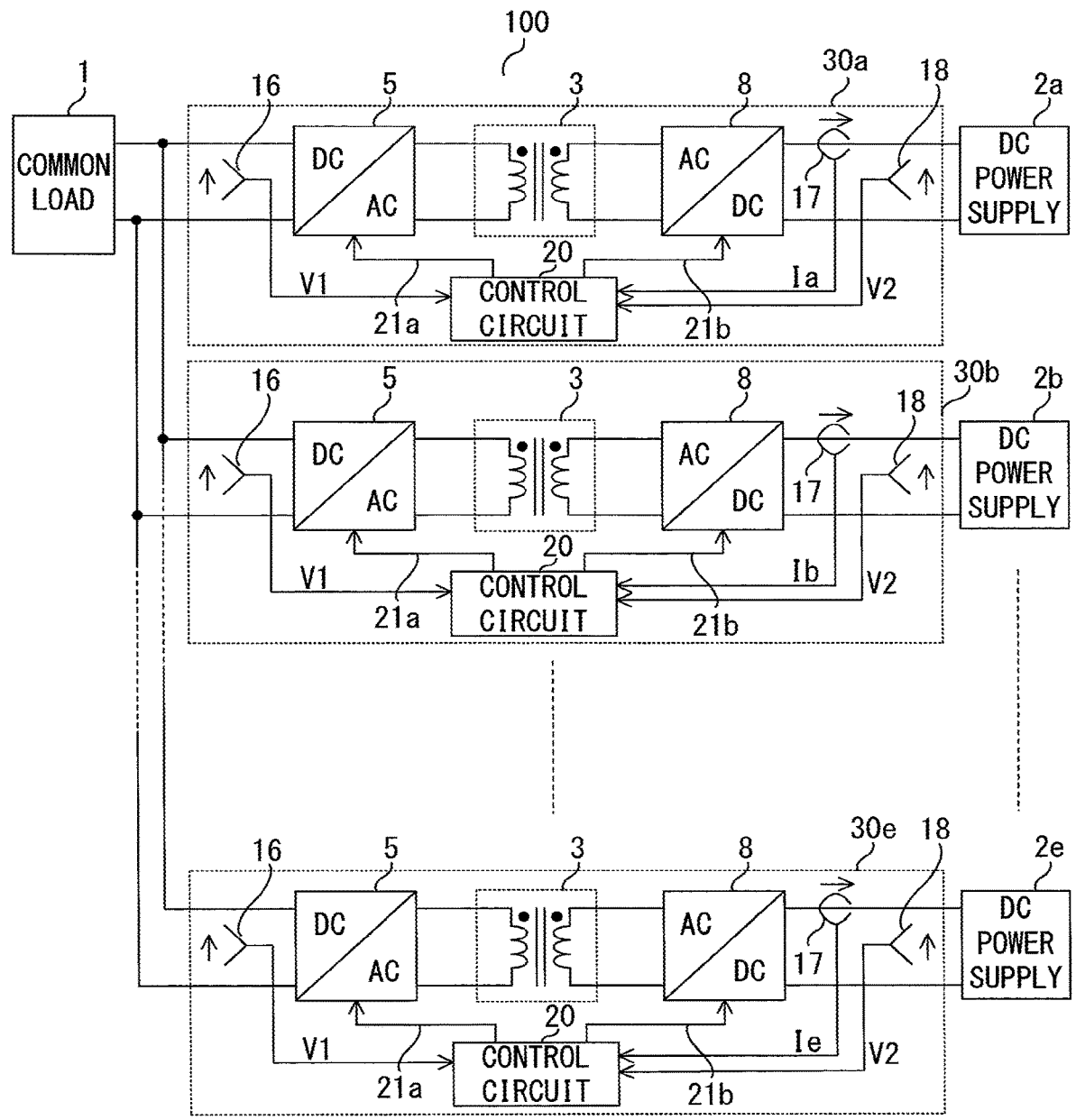
FIG. 18 is a schematic configuration diagram of a parallel power supply device according to embodiment 4 of the present invention.

FIG. 18 shows the schematic configuration of a parallel power supply device according to embodiment 4 of the present invention.

In the present embodiment, voltage detectors 18 for detecting voltages V2 of the DC power supplies 2a to 2e are provided to the DC/DC converters 30a to 30e. On the basis of the detected voltage V1 of the common load 1 and the detected voltages V2 and currents Ia to Ie of the DC power supplies 2a to 2e, the control circuits 20 respectively generate drive signals 21a, 21b to control the first and second switching circuits 5, 8. The other configurations are the same as in embodiment 1.

In this case, each control circuit 20 adjusts the gain of the second compensator 29 in the current control circuit 27 in accordance with the voltage V2. In this case, the adjustment is performed such that the gain is decreased as voltage V2 increases. Thus, the parallel power supply device 100 provides the same effect as in the above embodiment 1, and further provides the following effect. That is, even if the voltages V2 of the DC power supplies 2a to 2e vary in a wide range, it is possible to control the DC/DC converters 30a to 30e with a certain level of control performance ensured.

It is noted that the present embodiment 4 is applicable also to the above embodiment 2 in the same manner. In this case, on the basis of the detected voltage V1 of the common load 1 and the detected voltages V2 of the DC power supplies 2a to 2e, the control circuits 20 respectively generate drive signals 21a, 21b to control the first and second switching circuits 5, 8. Then, the gain of the compensator 23 in the voltage control circuit 24A is adjusted in accordance with the voltage V2. Thus, the same effect as in the above embodiment 2 is obtained, and even if the voltages V2 of the DC power supplies 2a to 2e vary in a wide range, it is possible to control the DC/DC converters 30a to 30e with a certain level of control performance ensured.

In the above embodiments, the common load 1 may be a resistance load, a capacitor load, an AC/DC inverter, or a DC power supply, and the DC power supplies 2a to 2e may be storage batteries.

It is noted that, within the scope of the present invention, the above embodiments may be freely combined with each other, or each of the above embodiments may be modified or simplified as appropriate.

The invention claimed is:
1. A parallel power supply device in which a plurality of DC/DC converters each performing bidirectional power transmission are connected in parallel to supply power to a common load, each DC/DC converter comprising:
  a transformer;
  a first switching circuit configured to be a full-bridge circuit with two bridge circuits having a plurality of semiconductor switching elements to which diodes are respectively connected in antiparallel, the first switching circuit being connected between the common load and a first winding of the transformer and performing power conversion between DC and AC;
  a second switching circuit configured to be a full-bridge circuit with two bridge circuits having a plurality of semiconductor switching elements to which diodes are respectively connected in antiparallel, the second switching circuit being connected between a DC power supply and a second winding of the transformer and performing power conversion between DC and AC;
  a first reactor and a second reactor connected to AC input/output lines of the first switching circuit and the second switching circuit, respectively; and
  a control circuit for controlling the first switching circuit and the second switching circuit, wherein
  each control circuit includes a voltage control unit having a compensator and generating a duty cycle so that a deviation between voltage of the common load and target voltage becomes 0, and on the basis of the duty cycle, the control circuit determines first and second phase shift amounts for drive signals for the first and second switching circuits, to control the first and second switching circuits, and
  each control circuit uses the duty cycle corrected such that, when a magnitude of the duty cycle generated by the voltage control unit is smaller than a set value, the magnitude is fixed at 0, and otherwise, the magnitude is decreased by the set value.

2. The parallel power supply device according to claim 1, wherein the voltage control unit in each control circuit includes:
  a first compensator and a second compensator as the compensator;
  a voltage control circuit for generating target current so that the deviation between the voltage of the common load and the target voltage becomes 0 by the first compensator; and
  a current control circuit for generating the duty cycle so that a deviation between the target current and current between the second switching circuit and the DC power supply becomes 0 by the second compensator.

3. The parallel power supply device according to claim 1, wherein
  capacitors are connected in parallel to the respective semiconductor switching elements in the first and second switching circuits so as to allow the semiconductor switching elements to perform zero voltage switching.

4. The parallel power supply device according to claim 1, wherein
  one of the semiconductor switching elements in each of the first and second switching circuits is defined as a reference element, and one of the semiconductor switching elements that is diagonal thereto in each of the first and second switching circuits is defined as a diagonal element, and
  each control circuit determines, as the first and second phase shift amounts, phase differences of drive signals for the respective diagonal elements in the first and second switching circuits relative to phases of drive signals for the reference elements in a power-transmitting-side circuit of the first and second switching circuits.

5. The parallel power supply device according to claim 4, wherein
  when the magnitude of the duty cycle generated by the voltage control unit is smaller than the set value, the control circuit fixes the first and second phase shift amounts at a maximum value.

6. The parallel power supply device according to claim 5, wherein
  when the magnitude of the duty cycle is equal to or greater than the set value, the control circuit performs control such that, in a region not exceeding a reference point of the duty cycle at which the first and second phase shift amounts are both minimum, the first and second phase shift amounts are decreased by an equal amount as the magnitude of the duty cycle increases, and in a region where the magnitude of the duty cycle exceeds the reference point, one of the first and second phase shift amounts is kept minimum and the other one is increased as the magnitude of the duty cycle increases.

7. The parallel power supply device according to claim 1, wherein
  the set value with respect to the magnitude of the duty cycle is determined on the basis of a detection error level of the voltage of the common load and a gain of the compensator.

8. The parallel power supply device according to claim 7, wherein
  each control circuit adjusts the gain of the compensator in accordance with voltage of the DC power supply.

9. The parallel power supply device according to claim 1, wherein
  of the plurality of DC/DC converters, two or more DC/DC converters are connected in common to the DC power supply.

10. The parallel power supply device according to claim 2, wherein
  capacitors are connected in parallel to the respective semiconductor switching elements in the first and second switching circuits so as to allow the semiconductor switching elements to perform zero voltage switching.

11. The parallel power supply device according to claim 2, wherein
  one of the semiconductor switching elements in each of the first and second switching circuits is defined as a reference element, and one of the semiconductor switching elements that is diagonal thereto in each of the first and second switching circuits is defined as a diagonal element, and
  each control circuit determines, as the first and second phase shift amounts, phase differences of drive signals for the respective diagonal elements in the first and second switching circuits relative to phases of drive signals for the reference elements in a power-transmitting-side circuit of the first and second switching circuits.

12. The parallel power supply device according to claim 3, wherein
  one of the semiconductor switching elements in each of the first and second switching circuits is defined as a reference element, and one of the semiconductor switching elements that is diagonal thereto in each of the first and second switching circuits is defined as a diagonal element, and each control circuit determines, as the first and second phase shift amounts, phase differences of drive signals for the respective diagonal elements in the first and second switching circuits relative to phases of drive signals for the reference elements in a power-transmitting-side circuit of the first and second switching circuits.

13. The parallel power supply device according to claim 10, wherein
one of the semiconductor switching elements in each of the first and second switching circuits is defined as a reference element, and one of the semiconductor switching elements that is diagonal thereto in each of the first and second switching circuits is defined as a diagonal element, and
each control circuit determines, as the first and second phase shift amounts, phase differences of drive signals for the respective diagonal elements in the first and second switching circuits relative to phases of drive signals for the reference elements in a power-transmitting-side circuit of the first and second switching circuits.

14. The parallel power supply device according to claim 11, wherein
when the magnitude of the duty cycle generated by the voltage control unit is smaller than the set value, the control circuit fixes the first and second phase shift amounts at a maximum value.

15. The parallel power supply device according to claim 12, wherein
when the magnitude of the duty cycle generated by the voltage control unit is smaller than the set value, the control circuit fixes the first and second phase shift amounts at a maximum value.

16. The parallel power supply device according to claim 13, wherein
when the magnitude of the duty cycle generated by the voltage control unit is smaller than the set value, the control circuit fixes the first and second phase shift amounts at a maximum value.

17. The parallel power supply device according to claim 14, wherein
when the magnitude of the duty cycle is equal to or greater than the set value, the control circuit performs control such that, in a region not exceeding a reference point of the duty cycle at which the first and second phase shift amounts are both minimum, the first and second phase shift amounts are decreased by an equal amount as the magnitude of the duty cycle increases, and in a region where the magnitude of the duty cycle exceeds the reference point, one of the first and second phase shift amounts is kept minimum and the other one is increased as the magnitude of the duty cycle increases.

18. The parallel power supply device according to claim 15, wherein
when the magnitude of the duty cycle is equal to or greater than the set value, the control circuit performs control such that, in a region not exceeding a reference point of the duty cycle at which the first and second phase shift amounts are both minimum, the first and second phase shift amounts are decreased by an equal amount as the magnitude of the duty cycle increases, and in a region where the magnitude of the duty cycle exceeds the reference point, one of the first and second phase shift amounts is kept minimum and the other one is increased as the magnitude of the duty cycle increases.

19. The parallel power supply device according to claim 16, wherein
when the magnitude of the duty cycle is equal to or greater than the set value, the control circuit performs control such that, in a region not exceeding a reference point of the duty cycle at which the first and second phase shift amounts are both minimum, the first and second phase shift amounts are decreased by an equal amount as the magnitude of the duty cycle increases, and in a region where the magnitude of the duty cycle exceeds the reference point, one of the first and second phase shift amounts is kept minimum and the other one is increased as the magnitude of the duty cycle increases.

20. The parallel power supply device according to claim 2, wherein
the set value with respect to the magnitude of the duty cycle is determined on the basis of a detection error level of the voltage of the common load and a gain of the compensator.

\* \* \* \* \*